US008775023B2

(12) United States Patent
Fröjdh et al.

(10) Patent No.: US 8,775,023 B2
(45) Date of Patent: Jul. 8, 2014

(54) LIGHT-BASED TOUCH CONTROLS ON A STEERING WHEEL AND DASHBOARD

(71) Applicant: Neonode Inc., Santa Clara, CA (US)

(72) Inventors: Gunnar Martin Fröjdh, Dalarö (SE); Simon Fellin, Sigtuna (SE); Thomas Eriksson, Stockholm (SE); John Karlsson, Märsta (SE); Maria Hedin, Bromma (SE); Richard Berglind, Älvsjö (SE)

(73) Assignee: Neanode Inc., Santa Clara, CA (US)

( * ) Notice: Subject to any disclaimer, the term of this patent is extended or adjusted under 35 U.S.C. 154(b) by 0 days.

(21) Appl. No.: 14/088,458

(22) Filed: Nov. 25, 2013

(65) Prior Publication Data

US 2014/0081521 A1 Mar. 20, 2014

Related U.S. Application Data

(63) Continuation-in-part of application No. 13/854,074, filed on Mar. 30, 2013, and a continuation-in-part of (Continued)

(51) Int. Cl.
*G06F 7/00* (2006.01)
*G06F 3/01* (2006.01)
*G06F 3/033* (2013.01)
*G06F 3/041* (2006.01)

(52) U.S. Cl.
CPC ............... *G06F 3/017* (2013.01); *G06F 3/033* (2013.01); *G06F 3/041* (2013.01); *H04M 2250/22* (2013.01)
USPC ............................... 701/36; 701/41; 701/418

(58) Field of Classification Search
CPC ....... G06F 3/041; G06F 3/033; G06F 1/1626; G06F 1/169; G06F 3/017; G06F 3/0304; B62D 6/00; B62D 7/222

USPC ........... 701/1, 36, 41, 45, 418, 538; 345/173; 178/18.03
See application file for complete search history.

(56) References Cited

U.S. PATENT DOCUMENTS

| 4,243,879 A | 1/1981 | Carroll et al. |
| 4,301,447 A | 11/1981 | Funk et al. |

(Continued)

FOREIGN PATENT DOCUMENTS

| EP | 0330767 A1 | 9/1989 |
| EP | 0516394 A2 | 11/1992 |

(Continued)

OTHER PUBLICATIONS

Moeller et al., Scanning FTIR: "Unobtrusive Optoelectronic Multi-Touch Sensing through Waveguide Transmissivity Imaging", TEI '10 Proceedings of the Fourth International Conference on Tangible, Embedded, and Embodied Interaction, ACM, New York, NY, Jan. 25-27, 2010, pp. 73-76.

(Continued)

*Primary Examiner* — Gertrude Arthur Jeanglaud
(74) *Attorney, Agent, or Firm* — Soquel Group LLC

(57) ABSTRACT

A system for use in a vehicle, including a steering element situated opposite a driver seat in a vehicle, the steering element including a plurality of proximity sensors encased in the periphery of the steering element operable to detect hand gestures along the outer periphery of the steering element, an interactive deck housed in the vehicle, for providing at least one of radio broadcast, video broadcast, audio entertainment, video entertainment and navigational assistance in the vehicle, and a processor housed in the vehicle, coupled with the proximity sensors and the deck, operable to identify the hand gestures detected by the proximity sensors, and to control the deck in response to thus-identified hand gestures.

81 Claims, 46 Drawing Sheets

Related U.S. Application Data application No. 13/775,269, filed on Feb. 25, 2013, and a continuation-in-part of application No. 13/424,543, filed on Mar. 20, 2012, said application No. 13/854,074 is a continuation of application No. 13/424,592, filed on Mar. 20, 2012, now Pat. No. 8,416,217, said application No. 13/775,269 is a continuation-in-part of application No. 13/732,456, filed on Jan. 2, 2013, now Pat. No. 8,643,628, said application No. 13/424,543 is a continuation-in-part of application No. PCT/US2011/029191, filed on Mar. 21, 2011, and a continuation-in-part of application No. 12/371,609, filed on Feb. 15, 2009, now Pat. No. 8,339,379, and a continuation-in-part of application No. 12/760,567, filed on Apr. 15, 2010, and a continuation-in-part of application No. 12/760,568, filed on Apr. 15, 2010.

(60) Provisional application No. 61/730,139, filed on Nov. 27, 2012, provisional application No. 61/564,868, filed on Nov. 30, 2011, provisional application No. 61/564,164, filed on Nov. 28, 2011, provisional application No. 61/379,012, filed on Sep. 1, 2010, provisional application No. 61/380,600, filed on Sep. 7, 2010, provisional application No. 61/410,930, filed on Nov. 7, 2010, provisional application No. 61/169,779, filed on Apr. 16, 2009.

(56) References Cited

U.S. PATENT DOCUMENTS

| | | |
|---|---|---|
| 4,518,249 A | 5/1985 | Murata et al. |
| 4,550,250 A | 10/1985 | Mueller et al. |
| 4,703,316 A | 10/1987 | Sherbeck |
| 4,710,760 A | 12/1987 | Kasday |
| 4,782,328 A | 11/1988 | Denlinger |
| 4,790,028 A | 12/1988 | Ramage |
| 4,847,606 A | 7/1989 | Beiswenger |
| 4,880,969 A | 11/1989 | Lawrie |
| 4,928,094 A | 5/1990 | Smith |
| 5,003,505 A | 3/1991 | McClelland |
| 5,016,008 A | 5/1991 | Gruaz et al. |
| 5,036,187 A | 7/1991 | Yoshida et al. |
| 5,053,758 A | 10/1991 | Cornett et al. |
| 5,103,085 A | 4/1992 | Zimmerman |
| 5,119,079 A | 6/1992 | Hube et al. |
| 5,162,783 A | 11/1992 | Moreno |
| 5,179,369 A | 1/1993 | Person et al. |
| 5,194,863 A | 3/1993 | Barker et al. |
| 5,220,409 A | 6/1993 | Bures |
| 5,283,558 A | 2/1994 | Chan |
| 5,406,307 A | 4/1995 | Hirayama et al. |
| 5,414,413 A | 5/1995 | Tamaru et al. |
| 5,422,494 A | 6/1995 | West et al. |
| 5,463,725 A | 10/1995 | Henckel et al. |
| 5,559,727 A | 9/1996 | Deley et al. |
| 5,577,733 A | 11/1996 | Downing |
| 5,579,035 A | 11/1996 | Beiswenger |
| 5,603,053 A | 2/1997 | Gough et al. |
| 5,612,719 A | 3/1997 | Beernink et al. |
| 5,618,232 A | 4/1997 | Martin |
| 5,729,250 A | 3/1998 | Bishop et al. |
| 5,748,185 A | 5/1998 | Stephan et al. |
| 5,785,439 A | 7/1998 | Bowen |
| 5,825,352 A | 10/1998 | Bisset et al. |
| 5,838,308 A | 11/1998 | Knapp et al. |
| 5,880,743 A | 3/1999 | Moran et al. |
| 5,886,697 A | 3/1999 | Naughton et al. |
| 5,889,236 A | 3/1999 | Gillespie et al. |
| 5,900,875 A | 5/1999 | Haitani et al. |
| 5,914,709 A | 6/1999 | Graham et al. |
| 5,936,615 A | 8/1999 | Waters |
| 5,943,043 A | 8/1999 | Furuhata et al. |
| 5,943,044 A | 8/1999 | Martinelli et al. |
| 5,956,030 A | 9/1999 | Conrad et al. |
| 5,988,645 A | 11/1999 | Downing |
| 6,010,061 A | 1/2000 | Howell |
| 6,023,265 A | 2/2000 | Lee |
| 6,031,989 A | 2/2000 | Cordell |
| 6,052,279 A | 4/2000 | Friend et al. |
| 6,073,036 A | 6/2000 | Heikkinen et al. |
| 6,085,204 A | 7/2000 | Chijiwa et al. |
| 6,091,405 A | 7/2000 | Lowe et al. |
| 6,246,395 B1 | 6/2001 | Goyins et al. |
| 6,259,436 B1 | 7/2001 | Moon et al. |
| 6,292,179 B1 | 9/2001 | Lee |
| 6,323,846 B1 | 11/2001 | Westerman et al. |
| 6,340,979 B1 | 1/2002 | Beaton et al. |
| 6,346,935 B1 | 2/2002 | Nakajima et al. |
| 6,356,287 B1 | 3/2002 | Ruberry et al. |
| 6,359,632 B1 | 3/2002 | Eastty et al. |
| 6,362,468 B1 | 3/2002 | Murakami et al. |
| 6,411,283 B1 | 6/2002 | Murphy |
| 6,421,042 B1 | 7/2002 | Omura et al. |
| 6,429,857 B1 | 8/2002 | Masters et al. |
| 6,456,952 B1 | 9/2002 | Nathan |
| 6,529,920 B1 | 3/2003 | Arons et al. |
| 6,542,191 B1 | 4/2003 | Yonezawa |
| 6,549,217 B1 | 4/2003 | De Greef et al. |
| 6,570,557 B1 | 5/2003 | Westerman et al. |
| 6,597,345 B2 | 7/2003 | Hirshberg |
| 6,628,268 B1 | 9/2003 | Harada et al. |
| 6,639,584 B1 | 10/2003 | Li |
| 6,646,633 B1 | 11/2003 | Nicolas |
| 6,677,932 B1 | 1/2004 | Westerman |
| 6,690,365 B2 | 2/2004 | Hinckley et al. |
| 6,690,387 B2 | 2/2004 | Zimmerman et al. |
| 6,707,449 B2 | 3/2004 | Hinckley et al. |
| 6,727,917 B1 | 4/2004 | Chew et al. |
| 6,734,883 B1 | 5/2004 | Wynn et al. |
| 6,757,002 B1 | 6/2004 | Oross et al. |
| 6,788,292 B1 | 9/2004 | Nako et al. |
| 6,803,906 B1 | 10/2004 | Morrison et al. |
| 6,833,827 B2 | 12/2004 | Lui et al. |
| 6,836,367 B2 | 12/2004 | Seino et al. |
| 6,857,746 B2 | 2/2005 | Dyner |
| 6,864,882 B2 | 3/2005 | Newton |
| 6,874,683 B2 | 4/2005 | Keronen et al. |
| 6,888,536 B2 | 5/2005 | Westerman et al. |
| 6,944,557 B2 | 9/2005 | Hama et al. |
| 6,947,032 B2 | 9/2005 | Morrison et al. |
| 6,954,197 B2 | 10/2005 | Morrison et al. |
| 6,958,749 B1 | 10/2005 | Matsushita et al. |
| 6,972,401 B2 | 12/2005 | Akitt et al. |
| 6,988,246 B2 | 1/2006 | Kopitzke et al. |
| 6,992,660 B2 | 1/2006 | Kawano et al. |
| 7,006,077 B1 | 2/2006 | Uusimaki |
| 7,007,239 B1 | 2/2006 | Hawkins et al. |
| 7,030,861 B1 | 4/2006 | Westerman et al. |
| 7,046,232 B2 | 5/2006 | Inagaki et al. |
| 7,133,032 B2 | 11/2006 | Cok |
| 7,155,683 B1 | 12/2006 | Williams |
| 7,159,763 B2 | 1/2007 | Yap et al. |
| 7,176,905 B2 | 2/2007 | Baharav et al. |
| 7,184,030 B2 | 2/2007 | McCharles et al. |
| 7,221,462 B2 | 5/2007 | Cavallucci |
| 7,225,408 B2 | 5/2007 | O'Rourke |
| 7,232,986 B2 | 6/2007 | Worthington et al. |
| 7,254,775 B2 | 8/2007 | Geaghan et al. |
| 7,265,748 B2 | 9/2007 | Ryynanen |
| 7,283,845 B2 | 10/2007 | De Bast |
| 7,286,063 B2 | 10/2007 | Gauthey et al. |
| RE40,153 E | 3/2008 | Westerman et al. |
| 7,339,580 B2 | 3/2008 | Westerman et al. |
| 7,352,940 B2 | 4/2008 | Charters et al. |
| 7,355,594 B2 | 4/2008 | Barkan |
| 7,369,724 B2 | 5/2008 | Deane |
| 7,372,456 B2 | 5/2008 | McLintock |
| 7,429,706 B2 | 9/2008 | Ho |
| 7,435,940 B2 | 10/2008 | Eliasson et al. |
| 7,441,196 B2 | 10/2008 | Gottfurcht et al. |

(56) References Cited

U.S. PATENT DOCUMENTS

| | | |
|---|---|---|
| 7,442,914 B2 | 10/2008 | Eliasson et al. |
| 7,464,110 B2 | 12/2008 | Pyhalammi et al. |
| 7,465,914 B2 | 12/2008 | Eliasson et al. |
| 7,469,381 B2 | 12/2008 | Ording |
| 7,479,949 B2 | 1/2009 | Jobs et al. |
| 7,518,738 B2 | 4/2009 | Cavallucci et al. |
| 7,633,300 B2 | 12/2009 | Keroe et al. |
| 7,663,607 B2 | 2/2010 | Hotelling et al. |
| 7,705,835 B2 | 4/2010 | Eikman |
| 7,742,290 B1 | 6/2010 | Kaya |
| 7,782,296 B2 | 8/2010 | Kong et al. |
| 7,812,828 B2 | 10/2010 | Westerman et al. |
| 7,855,716 B2 | 12/2010 | McCreary et al. |
| 7,880,724 B2 | 2/2011 | Nguyen et al. |
| 7,880,732 B2 | 2/2011 | Goertz |
| 8,022,941 B2 | 9/2011 | Smoot |
| 8,026,798 B2 | 9/2011 | Makinen et al. |
| 8,068,101 B2 | 11/2011 | Goertz |
| 8,095,879 B2 | 1/2012 | Goertz |
| 8,120,625 B2 | 2/2012 | Hinckley |
| 8,193,498 B2 | 6/2012 | Cavallucci et al. |
| 8,289,299 B2 | 10/2012 | Newton |
| 2001/0002694 A1 | 6/2001 | Nakazawa et al. |
| 2001/0022579 A1 | 9/2001 | Hirabayashi |
| 2001/0026268 A1 | 10/2001 | Ito |
| 2001/0028344 A1 | 10/2001 | Iwamoto et al. |
| 2001/0030641 A1 | 10/2001 | Suzuki |
| 2001/0043189 A1 | 11/2001 | Brisebois et al. |
| 2001/0055006 A1 | 12/2001 | Sano et al. |
| 2002/0002326 A1 | 1/2002 | Causey, III et al. |
| 2002/0027549 A1 | 3/2002 | Hirshberg |
| 2002/0046353 A1 | 4/2002 | Kishimoto |
| 2002/0060699 A1 | 5/2002 | D'Agostini |
| 2002/0067346 A1 | 6/2002 | Mouton |
| 2002/0075244 A1 | 6/2002 | Tani et al. |
| 2002/0109843 A1 | 8/2002 | Ehsani et al. |
| 2002/0171691 A1 | 11/2002 | Currans et al. |
| 2002/0173300 A1 | 11/2002 | Shtivelman et al. |
| 2002/0175900 A1 | 11/2002 | Armstrong |
| 2002/0191029 A1 | 12/2002 | Gillespie et al. |
| 2003/0002809 A1 | 1/2003 | Jian |
| 2003/0010043 A1 | 1/2003 | Ferragut, II |
| 2003/0013483 A1 | 1/2003 | Ausems et al. |
| 2003/0030656 A1 | 2/2003 | Ang et al. |
| 2003/0043207 A1 | 3/2003 | Duarte |
| 2003/0076306 A1 | 4/2003 | Zadesky et al. |
| 2003/0095102 A1 | 5/2003 | Kraft et al. |
| 2003/0122787 A1 | 7/2003 | Zimmerman et al. |
| 2003/0234346 A1 | 12/2003 | Kao |
| 2004/0021643 A1 | 2/2004 | Hoshino et al. |
| 2004/0021681 A1 | 2/2004 | Liao |
| 2004/0046960 A1 | 3/2004 | Wagner et al. |
| 2004/0056199 A1 | 3/2004 | O'Connor et al. |
| 2004/0100510 A1 | 5/2004 | Milic-Frayling et al. |
| 2004/0109013 A1 | 6/2004 | Goertz |
| 2004/0125143 A1 | 7/2004 | Deaton et al. |
| 2004/0198490 A1 | 10/2004 | Bansemer et al. |
| 2004/0199309 A1 | 10/2004 | Hayashi et al. |
| 2004/0263482 A1 | 12/2004 | Goertz |
| 2005/0021190 A1 | 1/2005 | Worrell et al. |
| 2005/0035956 A1 | 2/2005 | Sinclair et al. |
| 2005/0046621 A1 | 3/2005 | Kaikuranta |
| 2005/0052426 A1 | 3/2005 | Hagermoser et al. |
| 2005/0091612 A1 | 4/2005 | Stabb et al. |
| 2005/0104860 A1 | 5/2005 | McCreary et al. |
| 2005/0122308 A1 | 6/2005 | Bell et al. |
| 2005/0165615 A1 | 7/2005 | Minar |
| 2005/0174473 A1 | 8/2005 | Morgan et al. |
| 2005/0253818 A1 | 11/2005 | Nettamo |
| 2005/0271319 A1 | 12/2005 | Graham |
| 2006/0001654 A1 | 1/2006 | Smits |
| 2006/0047386 A1 | 3/2006 | Kanevsky et al. |
| 2006/0077186 A1 | 4/2006 | Park et al. |
| 2006/0161870 A1 | 7/2006 | Hotelling et al. |
| 2006/0161871 A1 | 7/2006 | Hotelling et al. |
| 2006/0229509 A1 | 10/2006 | Al-Ali et al. |
| 2006/0238517 A1 | 10/2006 | King et al. |
| 2006/0244733 A1 | 11/2006 | Geaghan |
| 2007/0024598 A1 | 2/2007 | Miller et al. |
| 2007/0077541 A1 | 4/2007 | Champagne et al. |
| 2007/0082707 A1 | 4/2007 | Flynt et al. |
| 2007/0084989 A1 | 4/2007 | Lange et al. |
| 2007/0146318 A1 | 6/2007 | Juh et al. |
| 2007/0150842 A1 | 6/2007 | Chaudhri et al. |
| 2007/0152984 A1 | 7/2007 | Ording et al. |
| 2008/0008472 A1 | 1/2008 | Dress et al. |
| 2008/0012835 A1 | 1/2008 | Rimon et al. |
| 2008/0012850 A1 | 1/2008 | Keating, III |
| 2008/0013913 A1 | 1/2008 | Lieberman et al. |
| 2008/0055273 A1 | 3/2008 | Forstall |
| 2008/0068353 A1 | 3/2008 | Lieberman et al. |
| 2008/0086703 A1 | 4/2008 | Flynt et al. |
| 2008/0089587 A1 | 4/2008 | Kim et al. |
| 2008/0093542 A1 | 4/2008 | Lieberman et al. |
| 2008/0100572 A1 | 5/2008 | Boillot |
| 2008/0100593 A1 | 5/2008 | Skillman et al. |
| 2008/0111797 A1 | 5/2008 | Lee |
| 2008/0117176 A1 | 5/2008 | Ko et al. |
| 2008/0117183 A1 | 5/2008 | Yu et al. |
| 2008/0121442 A1 | 5/2008 | Boer et al. |
| 2008/0122792 A1 | 5/2008 | Izadi et al. |
| 2008/0122796 A1 | 5/2008 | Jobs et al. |
| 2008/0122803 A1 | 5/2008 | Izadi et al. |
| 2008/0136790 A1 | 6/2008 | Hio |
| 2008/0152195 A1 | 6/2008 | Nagasaka et al. |
| 2008/0158174 A1 | 7/2008 | Land et al. |
| 2008/0165190 A1 | 7/2008 | Min et al. |
| 2008/0168404 A1 | 7/2008 | Ording |
| 2008/0192025 A1 | 8/2008 | Jaeger et al. |
| 2008/0211779 A1 | 9/2008 | Pryor |
| 2008/0259053 A1 | 10/2008 | Newton |
| 2008/0273019 A1 | 11/2008 | Deane |
| 2008/0297409 A1 | 12/2008 | Klassen et al. |
| 2008/0297487 A1 | 12/2008 | Hotelling et al. |
| 2009/0006418 A1 | 1/2009 | O'Malley |
| 2009/0027357 A1 | 1/2009 | Morrison |
| 2009/0031208 A1 | 1/2009 | Robinson |
| 2009/0058833 A1 | 3/2009 | Newton |
| 2009/0064055 A1 | 3/2009 | Chaudhri et al. |
| 2009/0066673 A1 | 3/2009 | Molne et al. |
| 2009/0096994 A1 | 4/2009 | Smits |
| 2009/0139778 A1* | 6/2009 | Butler et al. ............... 178/18.03 |
| 2009/0143052 A1 | 6/2009 | Bates et al. |
| 2009/0166098 A1 | 7/2009 | Sunder |
| 2009/0187840 A1 | 7/2009 | Moosavi |
| 2009/0189878 A1 | 7/2009 | Goertz et al. |
| 2009/0192849 A1 | 7/2009 | Hughes et al. |
| 2009/0198359 A1 | 8/2009 | Chaudhri |
| 2009/0285383 A1 | 11/2009 | Tsuei |
| 2009/0322699 A1 | 12/2009 | Hansson |
| 2009/0322701 A1 | 12/2009 | D'Souza et al. |
| 2010/0013763 A1 | 1/2010 | Futter et al. |
| 2010/0017872 A1 | 1/2010 | Goertz et al. |
| 2010/0053111 A1 | 3/2010 | Karlsson |
| 2010/0134424 A1 | 6/2010 | Brisebois et al. |
| 2010/0193259 A1 | 8/2010 | Wassvik |
| 2010/0238138 A1 | 9/2010 | Goertz et al. |
| 2010/0238139 A1 | 9/2010 | Goertz et al. |
| 2010/0283747 A1 | 11/2010 | Kukulski |
| 2010/0321289 A1 | 12/2010 | Kim et al. |
| 2011/0007032 A1 | 1/2011 | Goertz |
| 2011/0043485 A1 | 2/2011 | Goertz |
| 2011/0043826 A1 | 2/2011 | Kiyose |
| 2011/0050589 A1* | 3/2011 | Yan et al. ............... 345/173 |
| 2011/0087963 A1 | 4/2011 | Brisebois et al. |
| 2011/0128234 A1 | 6/2011 | Lipman et al. |
| 2011/0134064 A1 | 6/2011 | Goertz |
| 2011/0154260 A1 | 6/2011 | Wang et al. |
| 2011/0161843 A1 | 6/2011 | Bennett et al. |
| 2011/0163971 A1 | 7/2011 | Wagner et al. |
| 2011/0163998 A1 | 7/2011 | Goertz et al. |
| 2011/0167628 A1 | 7/2011 | Goertz et al. |
| 2011/0169780 A1 | 7/2011 | Goertz et al. |
| 2011/0169781 A1 | 7/2011 | Goertz et al. |

(56) References Cited

U.S. PATENT DOCUMENTS

| | | |
|---|---|---|
| 2011/0169782 A1 | 7/2011 | Goertz et al. |
| 2011/0175852 A1 | 7/2011 | Goertz et al. |
| 2011/0179368 A1 | 7/2011 | King et al. |
| 2011/0179381 A1 | 7/2011 | King |
| 2011/0181552 A1 | 7/2011 | Goertz et al. |
| 2011/0210946 A1 | 9/2011 | Goertz et al. |
| 2011/0239155 A1 | 9/2011 | Christie |
| 2011/0246923 A1 | 10/2011 | Kasahara et al. |
| 2011/0260980 A1 | 10/2011 | Palacios |
| 2011/0310005 A1 | 12/2011 | Chen et al. |
| 2012/0071994 A1 | 3/2012 | Lengeling |
| 2012/0081299 A1 | 4/2012 | Xiao et al. |
| 2012/0094723 A1 | 4/2012 | Goertz |
| 2012/0116548 A1 | 5/2012 | Goree et al. |
| 2012/0162078 A1 | 6/2012 | Ferren et al. |
| 2013/0024071 A1* | 1/2013 | Sivertsen ................. 701/41 |
| 2013/0204457 A1* | 8/2013 | King et al. ................. 701/1 |

FOREIGN PATENT DOCUMENTS

| | | |
|---|---|---|
| EP | 0601651 A1 | 6/1994 |
| EP | 0618528 A1 | 10/1994 |
| EP | 0703525 A1 | 3/1996 |
| EP | 1059603 A2 | 12/2000 |
| JP | 03-216719 A1 | 9/1991 |
| JP | 5173699 A | 12/1991 |
| JP | 11232024 A | 8/1999 |
| WO | 8600446 A1 | 1/1986 |
| WO | 8600447 A1 | 1/1986 |
| WO | 9615464 A1 | 5/1996 |
| WO | 0102949 A1 | 1/2001 |
| WO | 0140922 A2 | 6/2001 |
| WO | 02095668 A1 | 11/2002 |
| WO | 03038592 A1 | 5/2003 |
| WO | 03083767 A2 | 10/2003 |
| WO | 2005026938 A2 | 3/2005 |
| WO | 2008147266 A1 | 12/2008 |
| WO | 2009008786 A1 | 1/2009 |
| WO | 2010093570 A1 | 8/2010 |
| WO | 2010121031 A1 | 10/2010 |
| WO | 2011119483 A1 | 9/2011 |

OTHER PUBLICATIONS

Moeller et al., "IntangibleCanvas: Free-Air Finger Painting on a Projected Canvas", CHI EA '11 Proceedings of the 2011 Annual Conference Extended Abstracts on Human Factors in Computing Systems, ACM, New York, NY, May 7-12, 2011, pp. 1615-1620.

Moeller et al., "ZeroTouch: A Zero-Thickness Optical Multi-Touch Force Field", CHI EA '11 Proceedings of the 2011 Annual Conference Extended Abstracts on Human Factors in Computing Systems, ACM, New York, NY, May 7-12, 2011, pp. 1165-1170.

Moeller et al., "ZeroTouch: An Optical Multi-Touch and Free-Air Interaction Architecture", CHI 2012: Proceedings of the 2012 Annual Conference Extended Abstracts on Human Factors in Computing Systems, ACM, New York, NY, pp. 2165-2174.

Myers et al., "Two-Handed Input using a PDA and a Mouse", CHI 2000, CHI Letters, vol. 2, Issue 1, ACM, New York, NY, 2000, pp. 41-48.

Myers, "Using Handhelds and PCs Together", Communications of the ACM, ACM, New York, NY, Nov. 2001, vol. 44, No. 11, pp. 34-41.

Myers, "Mobile Devices for Control", Mobile HCI 2002, LNCS 2411, Springer-Verlag Berlin Heidelberg, 2002, pp. 1-8.

* cited by examiner

LIGHT-BASED TOUCH CONTROLS ON A STEERING WHEEL AND DASHBOARD

CROSS REFERENCES TO RELATED APPLICATIONS

This application is a non-provisional of U.S. Provisional Application No. 61/730,139, entitled LIGHT-BASED TOUCH CONTROLS ON A STEERING WHEEL AND DASHBOARD, and filed on Nov. 27, 2012 by inventors Gunnar Martin Fröjdh, Thomas Eriksson, John Karlsson, Maria Hedin and Richard Berglind, the contents of which are hereby incorporated herein in their entirety.

This application is also a continuation-in-part of U.S. application Ser. No. 13/854,074, entitled LIGHT-BASED FINGER GESTURE USER INTERFACE, and filed on Mar. 30, 2013 by inventors Thomas Eriksson, Per Leine, Jochen Laveno Mangelsdorff, Robert Pettersson and Anders Jansson, the contents of which are hereby incorporated herein in their entirety.

This application is also a continuation-in-part of U.S. application Ser. No. 13/775,269 entitled REMOVABLE PROTECTIVE COVER WITH EMBEDDED PROXIMITY SENSORS, and filed on Feb. 25, 2013 by inventors Thomas Eriksson, Stefan Holmgren, John Karlsson, Remo Behdasht, Erik Rosengren and Lars Sparf, the contents of which are hereby incorporated herein in their entirety.

This application is also a continuation-in-part of U.S. application Ser. No. 13/424,543, entitled OPTICAL ELEMENTS WITH ALTERNATING REFLECTIVE LENS FACETS, and filed on Mar. 20, 2012 by inventors Stefan Holmgren, Lars Sparf, Magnus Goertz, Thomas Eriksson, Joseph Shain, Anders Jansson, Niklas Kvist, Robert Pettersson and John Karlsson, the contents of which are hereby incorporated herein in their entirety.

U.S. application Ser. No. 13/854,074 is a continuation of U.S. Ser. No. 13/424,592, entitled LIGHT-BASED FINGER GESTURE USER INTERFACE, and filed on Mar. 20, 2012 by inventors Thomas Eriksson, Per Leine, Jochen Laveno Mangelsdorff, Robert Pettersson and Anders Jansson, now U.S. Pat. No. 8,416,217, the contents of which are hereby incorporated herein in their entirety.

U.S. application Ser. No. 13/424,592 claims priority benefit of U.S. Provisional Application Ser. No. 61/564,868, entitled LIGHT-BASED FINGER GESTURE USER INTERFACE, and filed on Nov. 30, 2011 by inventors Thomas Eriksson, Per Leine, Jochen Laveno Mangelsdorff, Robert Pettersson and Anders Jansson, the contents of which are hereby incorporated herein in their entirety.

U.S. application Ser. No. 13/775,269 is a continuation-in-part of U.S. patent application Ser. No. 13/732,456 entitled LIGHT-BASED PROXIMITY DETECTION SYSTEM AND USER INTERFACE, and filed on Jan. 3, 2013 by inventors Thomas Eriksson and Stefan Holmgren, the contents of which are hereby incorporated herein in their entirety.

U.S. application Ser. No. 13/424,543 claims priority benefit of U.S. Provisional Application Ser. No. 61/564,164, entitled OPTICAL ELEMENTS WITH ALTERNATIVE REFLECTIVE LENS FACETS, and filed on Nov. 28, 2011 by inventors Stefan Holmgren, Lars Sparf, Thomas Eriksson, Joseph Shain, Anders Jansson, Niklas Kvist, Robert Pettersson and John Karlsson, the contents of which are hereby incorporated herein in their entirety.

U.S. application Ser. No. 13/424,543 also claims priority benefit of PCT Application No. PCT/US11/29191, entitled LENS ARRANGEMENT FOR LIGHT-BASED TOUCH SCREEN, and filed on Mar. 21, 2011 by inventors Magnus Goertz, Thomas Eriksson, Joseph Shain, Anders Jansson, Niklas Kvist, Robert Pettersson, Lars Sparf and John Karlsson, the contents of which are hereby incorporated herein in their entirety.

U.S. application Ser. No. 13/424,543 is also a continuation-in-part of U.S. application Ser. No. 12/371,609, entitled LIGHT-BASED TOUCH SCREEN, and filed on Feb. 15, 2009 by inventors Magnus Goertz, Thomas Eriksson and Joseph Shain, now U.S. Pat. No. 8,339,379, the contents of which are hereby incorporated herein in their entirety.

U.S. application Ser. No. 13/424,543 is a continuation-in-part of U.S. application Ser. No. 12/760,567, entitled OPTICAL TOUCH SCREEN SYSTEMS USING REFLECTED LIGHT, and filed on Apr. 15, 2010 by inventors Magnus Goertz, Thomas Eriksson and Joseph Shain, the contents of which are hereby incorporated herein in their entirety.

U.S. application Ser. No. 13/424,543 is also a continuation-in-part of U.S. application Ser. No. 12/760,568, entitled OPTICAL TOUCH SCREEN SYSTEMS USING WIDE LIGHT BEAMS, and filed on Apr. 15, 2010 by inventors Magnus Goertz, Thomas Eriksson and Joseph Shain, the contents of which are hereby incorporated herein in their entirety.

PCT Application No. PCT/US11/29191 claims priority benefit of U.S. Provisional Application Ser. No. 61/379,012, entitled OPTICAL TOUCH SCREEN SYSTEMS USING REFLECTED LIGHT, and filed on Sep. 1, 2010 by inventors Magnus Goertz, Thomas Eriksson, Joseph Shain, Anders Jansson, Niklas Kvist and Robert Pettersson, the contents of which are hereby incorporated herein in their entirety.

PCT Application No. PCT/US11/29191 also claims priority benefit of U.S. Provisional Application Ser. No. 61/380,600, entitled OPTICAL TOUCH SCREEN SYSTEMS USING REFLECTED LIGHT, and filed on Sep. 7, 2010 by inventors Magnus Goertz, Thomas Eriksson, Joseph Shain, Anders Jansson, Niklas Kvist and Robert Pettersson, the contents of which are hereby incorporated herein in their entirety.

PCT Application No. PCT/US11/29191 also claims priority benefit of U.S. Provisional Application Ser. No. 61/410,930, entitled OPTICAL TOUCH SCREEN SYSTEMS USING REFLECTED LIGHT, and filed on Nov. 7, 2010 by inventors Magnus Goertz, Thomas Eriksson, Joseph Shain, Anders Jansson, Niklas Kvist, Robert Pettersson and Lars Sparf, the contents of which are hereby incorporated herein in their entirety.

U.S. application Ser. No. 12/760,567 claims priority benefit of U.S. Provisional Application Ser. No. 61/169,779, entitled OPTICAL TOUCH SCREEN, and filed on Apr. 16, 2009 by inventors Magnus Goertz, Thomas Eriksson and Joseph Shain, the contents of which are hereby incorporated herein in their entirety.

FIELD OF THE INVENTION

The field of the present invention is light-based user interfaces for vehicles.

BACKGROUND OF THE INVENTION

Reference is made to FIG. 1, which is a simplified illustration of prior art steering wheel. A prior art steering wheel 400, shown in FIG. 1, includes a circular gripping member 401, one or more connecting members 402-404 that connect the gripping member 401 to steering column 407, and buttons 405 and 406 on connecting members 402 and 403 for controlling various devices in the vehicle. Connecting members 402-404, which connect gripping member 401 to steering column 407, are also referred to as spokes. In FIG. 1, button 405 is used to answer an incoming phone call on the vehicle's BLUETOOTH® speaker phone and button 406 hangs up the call. BLUETOOTH is a trademark owned by the Bluetooth SIG of Kirkland, Wash., USA. Controls mounted in a steering wheel can be operated comfortably and safely since the driver is able to control and operate these controls without taking hands off the wheel or eyes off the road.

Originally, the first button added to a steering wheel was a switch to activate the car's electric horn. When cruise control systems were introduced, some automakers located the operating switches for this feature on the steering wheel as well. Today additional button controls for an audio system, a telephone and voice control system, a navigation system, a stereo system, and on board computer functions are commonly placed on the steering wheel.

US Patent Publication No. 2012/0232751 A1 for PRESSURE SENSITIVE STEERING WHEEL CONTROLS teaches adding pressure-sensitive controls to the circular gripping member of the steering wheel. Pressure sensors are located at various locations along the perimeter of the gripping member, and different locations correspond to different controls. A control is actuated in response to an application of pressure at a sensor location, e.g., by the user tightening his grip.

Many present-day vehicle dashboard consoles involve much more than simply displaying information to the driver. The driver, in many instances, is required to navigate a series of touch screen menus and icons in order to operate the dashboard console.

SUMMARY

The present invention relates to buttons and controls mounted in a steering element and associated dashboard user interfaces. More broadly, the present invention relates to remote controls for on board vehicle systems and associated user interfaces. The term "steering element" in the context of the present specification includes any physical element used to navigate a vehicle, such as a steering wheel, aircraft yoke, side-sticks and center-sticks, ship's wheel, bicycle or motorcycle handle bars.

Embodiments of the present invention provide a sensor system that detects position, proximity and pressure, separately or in combination, to enable input of complex gestures on and around a steering element. In some embodiments, the sensor system of the present invention is used in conjunction with a head-up display (HUD) or wearable goggles with built in picture presentation. In this case, the HUD or goggles render icons or a grid in the user's field of view. The user extends his hand to interact with the rendered image elements. The sensor detects the user's gestures in 3D space and these coordinates are then mapped onto the rendered image to interpret the user input.

Embodiments of the present invention also provide a dashboard coupled with a sensor system that utilizes the dashboard display for relevant information without cluttering the dashboard with buttons. The sensor system detects position, proximity and direction for input of complex gestures on the dashboard. In some embodiments, the dashboard is presented to the driver through a HUD or wearable goggles with built in picture presentation. In this case the sensor system enables the driver to interact with graphics presented by the HUD or goggles, by detecting the driver hand gestures and mapping them onto the projected HUD or goggle images. Embodiments of the present invention facilitate operation of the vehicle dashboard system by eliminating irrelevant information from the display. Moreover, a user interface in accordance with the present invention provides context-relevant options, namely, options related to the state and circumstances of the vehicle. E.g., the user interface presents parking options when the user stops the vehicle, and presents options to unlock various doors, such as the trunk and gas tank, when the motor is turned off.

The present invention relates to a motor vehicle, that includes a steering wheel situated opposite a driver seat in the motor vehicle, the steering wheel including a plurality of proximity sensors encased in the periphery of the steering wheel for detecting hand slide gestures along the outer periphery of the steering wheel, an entertainment and navigation system housed in a dashboard in the vehicle, and, a processor housed in the vehicle and connected to the sensors and to the entertainment and navigation system for controlling the entertainment and navigation system in response to the detected hand slide gestures.

In some embodiments, in response to a detected upward slide gesture the processor increases an adjustable setting for the entertainment and navigation system and in response to a detected downward slide gesture the processor decreases the adjustable setting.

In some embodiments, the entertainment and navigation system includes a plurality of adjustable features, wherein a setting for a selected feature is adjusted in response to the hand slide gestures, and wherein the processor changes the selected feature in response to at least one tap on the outer periphery of the steering wheel. When the processor changes the selected feature, a graphic indicating the newly selected feature is rendered on a display connected to the entertainment and navigation system, such as a dashboard-mounted display or HUD. In some embodiments, this display is situated inside goggles worn by the driver. Examples of adjustable settings include raising or lowering the audio volume, selecting a radio channel and selecting a track in a music library, bass, treble, image view in a GPS system—e.g., 2D view, 3D view, satellite view, and zooming an image.

In some embodiments, a second plurality of proximity sensors encased in the steering wheel facing the driver, detects hand wave gestures between the steering wheel and the driver, wherein the processor changes a mode of the entertainment and navigation system in response to the hand wave gestures. This said second plurality of proximity sensors is also operative to detect the driver entering the motor vehicle.

In some embodiments, the steering wheel further comprises a cavity, i.e., an air gap, an array of light emitters connected to the processor that project light beams across the cavity and an array of light detectors connected to the processor that detect the projected light beams. This enables detecting wave gestures inside the cavity that interrupt the light beams, which allows the user to control the entertainment and navigation system through these detected gestures inside the cavity. These wave gestures are performed by one or more fingers or by the palm of a hand.

In some embodiments having a steering wheel cavity, there are multiple arrays of light emitters connected to the processor that project light beams at different geometric planes across the cavity and multiple arrays of light detectors connected to the processor that detect the projected light beams, for detecting wave gestures across multiple geometric planes inside the cavity that interrupt the light beams. This enables detecting wave gestures across a depth of the cavity for a wide range of wave gestures. For example, these sensors detect an angle at which the finger or hand penetrates the cavity. They also detect a velocity of approach by measuring the different times at which the finger or hand crosses each geometric plane. In some embodiments of the cavity the light beams are all projected vertically across the cavity. In other embodiments, a bidirectional grid of light beams is projected across the cavity.

In order to prevent inadvertent adjusting of the entertainment system controls during driving, in certain embodiments the hand slide gestures control the entertainment and navigation system only when the steering wheel is not substantially rotated, namely, that it is at the "twelve-o'clock" position, or has not deviated more than a threshold amount from the "twelve-o'clock" position.

In some embodiments, the entertainment and navigation system includes a display, and the processor zooms an image on the display in response to detecting a spread gesture performed by two or more fingers in the cavity, and pans the image in response to a translation gesture performed by one or more fingers in the cavity. In some embodiments of the present invention, the finger spread gesture is performed by spreading or separating the tips of all fingers of one hand inside the cavity. In other embodiments of the present invention, the finger spread gesture is performed by extending all fingers of one hand inside the cavity. The image is, inter alia, a map related to the navigation system, a rear view camera image, or a graphic related to the entertainment system.

In some embodiments, the vehicle includes a wireless phone interface, inter alia a BLUETOOTH® interface, that is controlled using tap gestures or hand slide gestures on the outer perimeter of the steering wheel. For example, a single tap answers a call and a double-tap hangs up or declines the call.

In some embodiments, a sudden quick hand slide gesture along the outer periphery of the steering wheel mutes the entertainment and navigation system.

In some embodiments, when the processor changes the selected feature, the processor renders an image of the steering wheel on a display mounted in the vehicle, the image indicating which command is associated with each steering wheel input zone.

The present invention also relates to a motor vehicle having a dashboard display surrounded by a frame of proximity sensors for detecting wave gestures above the frame. A graphic representing a group of related functions is presented in a corner of the display. In response to a diagonal wave gesture above the frame beginning above this corner, the graphic is translated across the display revealing icons for the related functions. In some embodiments different graphics representing different groups of functions are presented in respective display corners, and a diagonal wave gesture beginning at a corner opens that corner's group of functions by translating the corresponding graphic diagonally across the display.

There is thus provided in accordance with an embodiment of the present invention, a system for use in a vehicle, including a steering element situated opposite a driver seat in a vehicle, the steering element including a plurality of proximity sensors encased in the periphery of the steering element operable to detect hand gestures along the outer periphery of the steering element, an interactive deck housed in the vehicle, for providing at least one of radio broadcast, video broadcast, audio entertainment, video entertainment and navigational assistance in the vehicle, and a processor housed in the vehicle, coupled with the proximity sensors and the deck, operable to identify the hand gestures detected by the proximity sensors, and to control the deck in response to thus-identified hand gestures.

There is additionally provided in accordance with an embodiment of the present invention a dashboard for a vehicle, including a display, a frame including proximity sensors for detecting hand gestures above the frame, and a processor coupled with the display and the frame, operable to present a graphic representing a group of related functions in a corner of the display, and to identify the hand gestures detected by the proximity sensors, and wherein, in response to identifying a diagonal hand wave gesture above the frame and beginning above the corner of the display, the processor translates the graphic across the display thereby revealing icons for the related functions.

BRIEF DESCRIPTION OF THE DRAWINGS

The present invention will be more fully understood and appreciated from the following detailed description, taken in conjunction with the drawings in which.

Figure 1:
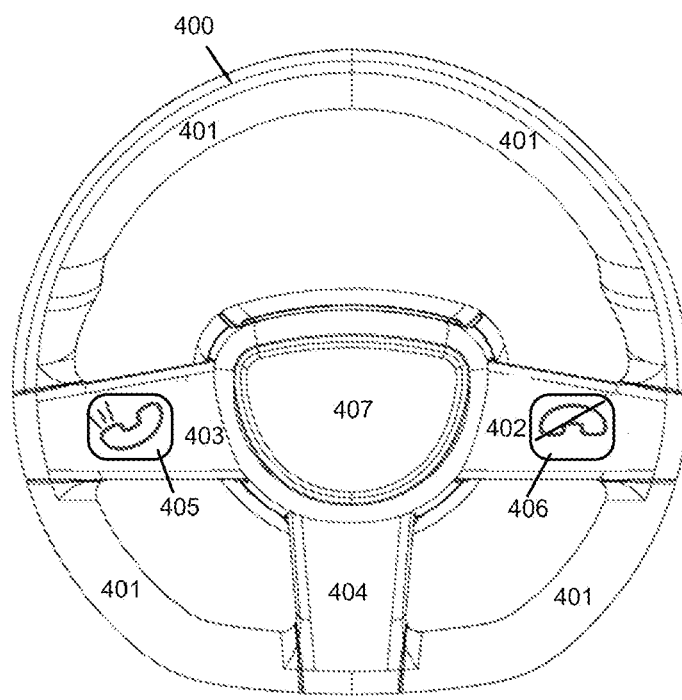
FIG. 1 is a simplified illustration of prior art steering wheel.

In the specification and figures, the following numbering scheme is used. Steps in flow charts are numbered between 1-99, light transmitters are numbered in the 100's, light receivers are numbered in the 200's, light guides and lenses are numbered in the 300's, miscellaneous items are numbered in the 400's, detection zones and sensors are numbered in the 500's, and light beams are numbered in the 600's. Like numbered elements are similar but not necessarily identical.

The following tables catalog the numbered elements and list the figures in which each numbered element appears.

| Light Transmitters | |
|---|---|
| Element | FIGS. |
| 100 | 9, 30, 36, 37, 38 |
| 101 | 14, 15, 16 |
| 102 | 15 |
| 103 | 9, 19, 20 |
| 104 | 9, 23, 24, 25 |
| 106 | 26 |
| 107 | 26 |
| 108 | 26 |
| 109 | 35 |

| Light Receivers | |
|---|---|
| Element | FIGS. |
| 200 | 9, 30, 36, 37, 38 |
| 201 | 14, 15 |
| 202 | 15 |
| 203 | 9, 19 |
| 204 | 28, 29, 30 |
| 209 | 35 |
| 210 | 35 |

| Light Guides and Lenses | |
|---|---|
| Element | FIGS. |
| 300 | 9, 10, 11, 30, 36, 37, 38 |
| 310 | 9, 10, 11, 36 |
| 311 | 9, 10, 11, 36 |
| 320 | 9, 10, 11, 18, 19, 20 |
| 321 | 18 |
| 330 | 9, 10, 11, 14, 15, 16 |
| 331 | 9, 10, 11, 14, 15 |
| 332 | 13 |
| 333 | 13 |
| 334 | 13 |
| 335 | 14, 15 |
| 336 | 15 |
| 337 | 15 |
| 338 | 15 |
| 340 | 9, 10, 11, 28 |
| 341 | 9, 10, 11, 23, 24, 25 |

-continued

| Light Guides and Lenses | |
|---|---|
| Element | FIGS. |
| 342 | 22 |
| 343 | 24, 25 |
| 344 | 23, 25 |
| 345 | 23, 24, 25, 26 |
| 346 | 27, 28 |
| 347 | 29 |
| 348 | 29, 30 |
| 353 | 28 |
| 354 | 32, 33 |
| 355 | 32, 33 |
| 356 | 32, 33 |
| 357 | 32, 33 |
| 358 | 34, 35 |
| 359 | 34 |
| 360 | 34 |
| 361 | 34 |
| 362 | 36 |

| Miscellaneous Items | | |
|---|---|---|
| Element | FIGS. | Description |
| 400 | 1, 9, 31, 39-43 | steering wheel |
| 401 | 1, 2 | grip |
| 402 | 1, 2 | right spoke |
| 403 | 1, 2 | left spoke |
| 404 | 1, 2 | bottom spoke |
| 405 | 1 | answer button |
| 406 | 1 | reject button |
| 407 | 1, 2, 41, 43 | steering column |
| 408 | 5 | nominal range |
| 409 | 5 | nominal range |
| 410 | 5 | thickness of grip |
| 411 | 9, 10, 11, 30 | PCB |
| 412 | 9 | opening in steering wheel |
| 413 | 16, 20 | finger |
| 414 | 17 | recessed cavity wall |
| 415 | 17 | recessed cavity wall |
| 416 | 17 | recessed cavity wall |
| 417 | 17 | inclined surface |
| 418 | 18 | intermediate layer |
| 419 | 18 | narrow openings |
| 420 | 26 | beam offset |
| 421 | 29 | cavities for light receivers in light guide |
| 422 | 33 | plastic rim |
| 423 | 44, 45, 46 | dashboard display |
| 424 | 44 | icon |
| 425 | 44, 45 | icon |
| 426 | 45 | diagonal sweep gesture |
| 427 | 45 | icon |
| 428 | 46 | icon |
| 429 | 46 | icon |
| 430 | 46 | text |
| 431 | 46 | icon |
| 432 | 46 | icon |
| 433 | 46 | directional sweep gesture |
| 434 | 46 | directional sweep gesture |
| 435 | 46 | directional sweep gesture |
| 436 | 46 | directional sweep gesture |
| 437 | 46 | directional sweep gesture |
| 438 | 46 | directional sweep gesture |
| 439 | 46 | directional sweep gesture |
| 440 | 46 | directional sweep gesture |
| 450 | 39, 40 | Touch screen display |
| 451 | 40 | Head-up display |
| 452 | 43 | Hand |

| Detection Zones and Sensors | | |
|---|---|---|
| Element | FIGS. | Description |
| 501 | 2, 21 | zone |
| 502 | 2 | zone |
| 503 | 2 | zone |
| 504 | 2 | zone |
| 505 | 2 | zone |
| 506 | 2 | zone |
| 507 | 2 | zone |
| 508 | 2 | zone |
| 510 | 3 | zone |
| 511 | 3 | zone |
| 512 | 3 | zone |
| 513 | 3 | zone |
| 514 | 3 | zone |
| 515 | 3 | zone |
| 516 | 3 | zone |
| 517 | 3 | zone |
| 520 | 12 | sensor |
| 521 | 12 | sensor |
| 522 | 17 | sensor |
| 523 | 17 | sensor |
| 524 | 31 | zone |
| 525 | 31 | zone |
| 526 | 31 | zone |
| 527 | 31 | zone |
| 528 | 39 | Zone |
| 530 | 39, 40 | Slider sensor |
| 531, 532 | 39, 41 | Proximity sensor strip |

| Light Beams | | |
|---|---|---|
| Element | FIGS. | Description |
| 600 | 4 | light beam grid |
| 601 | 16 | light beam |
| 602 | 16 | light beam |
| 603 | 16 | light beam |
| 604 | 20 | light beam |
| 605 | 25 | light beam |
| 606 | 26 | light beam |
| 607 | 26 | light beam |
| 608 | 26 | light beam |
| 610 | 26 | portion of light beam |
| 611 | 29 | light beam |
| 612 | 35 | light beam |
| 613 | 38 | light beam |
| 614 | 42 | Proximity sensor beam |
| 615 | 42 | Proximity sensor reflected beam |

DETAILED DESCRIPTION

Aspects of the present invention relate to light-based touch controls that allow a driver to keep his hands on a steering element while operating peripheral electronic devices in a vehicle.

Figure 2:
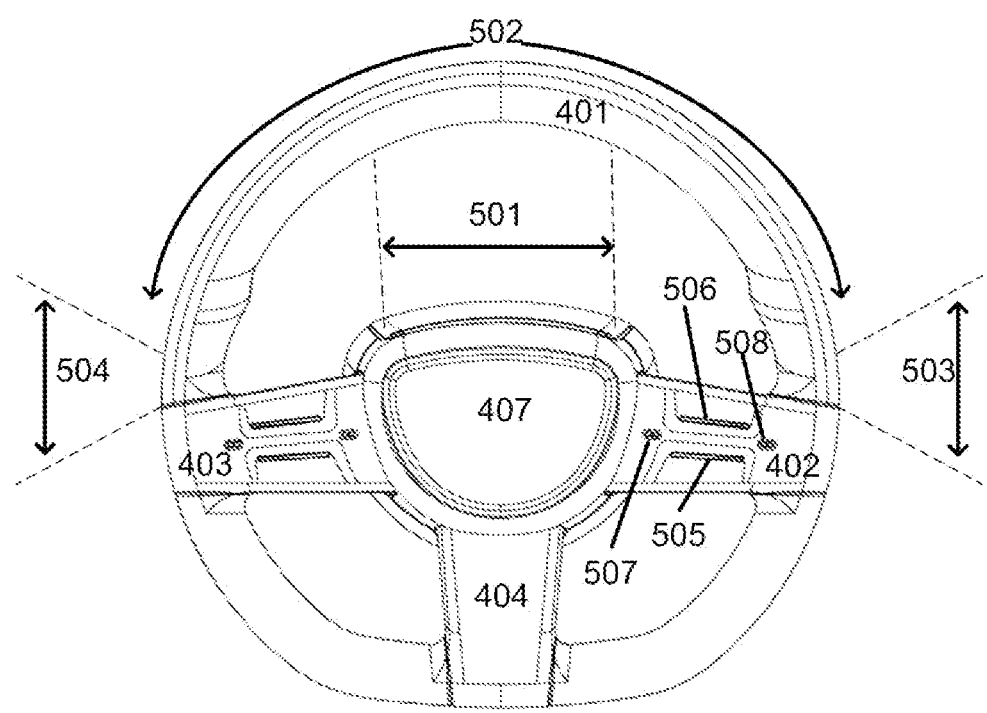
FIG. 2 is a simplified illustration of a first embodiment of a steering wheel having multiple detection zones, in accordance with an embodiment of the present invention.

Reference is made to FIG. 2, which is a simplified illustration of a first embodiment of a steering wheel having multiple detection zones, in accordance with an embodiment of the present invention. Shown in FIG. 2 is a steering wheel with multiple detection zones for user input, indicated by numbers in the figure. Detection properties for each zone are listed below.

Zone 501 is a portion of a cavity surrounded by gripping member 401 and the top of steering column 407. The present invention enables detection of user gestures in this cavity. An example gesture is sweeping a hand or finger horizontally across the cavity.

Zone 502 is related to a portion of the outer rim of gripping member 401. This zone is configured to receive sliding gestures, where the driver slides a finger or hand along this portion of the outer rim. An example application for this gesture is to control the volume on the vehicle's audio system, where a clockwise hand-slide or sweep gesture increases the volume, a counterclockwise hand-slide or sweep gesture reduces the volume, and a fast hand-slide or sweep gesture along zone 502 mutes the audio. If the audio is on mute, a fast hand-slide or sweep gesture along zone 502 cancels the mute. Another application is to use hand-slide or sweep gestures to answer or reject an incoming phone call. In this case a hand-slide or sweep gesture in a first direction, e.g., clockwise, answers the call, and a hand-slide or sweep gesture in the opposite direction rejects the call.

Zones 503 and 504 are proximity sensor zones configured to detect movement of a hand in the detection zone which is the airspace several inches outward on either side of the steering wheel. An example application uses zone 503 for controlling the windshield wipers and zone 504 for controlling the directional signals, i.e., blinking lamps mounted near the left and right front and rear corners of a vehicle activated by the driver on one side of the vehicle at a time to advertise intent to turn or change lanes toward that side. In this example, the windshield wipers are activated, or their speed is increased, when an upward hand gesture is detected in zone 503, and the windshield wipers are slowed down or turned off when a downward hand gesture is detected in zone 503. Similarly, the right directional signal is activated when an upward hand gesture is detected in zone 504, and the left directional signal is activated when a downward hand gesture is detected in zone 504.

Another example application for zones 503 and 504 is modeled on Formula One sports cars, where the gear shifter is adapted to fit onto the steering wheel in the form of two paddles; depressing the right paddle shifts into a higher gear, while depressing the left paddle shifts into a lower one. In the present embodiment, a gesture corresponding to depressing the right paddle is detected in zone 503, and a gesture corresponding to depressing the left paddle is detected in zone 504.

Zones 505 and 506 are two touch and slider controls on the right connecting member 402. An additional two touch and slider controls (not numbered) are shown on the left connecting member 403. These zones receive touch gestures and glide gestures. A glide gesture includes the steps of a user touching this sensor and then sliding his finger along the sensor. Slider controls are suitable for selecting a value within a range, e.g., to adjust dashboard brightness or audio volume. A glide gesture in one direction gradually increases the value, and a glide gesture in the opposite direction gradually decreases the value.

These controls determine a location of a touch along the slider and are therefore suitable for touch gestures as well. For example, extended touches or taps can be used for selecting a value within a range, such as to adjust dashboard brightness or audio volume. A tap or touch at one end of the slider increases the value, and a tap or touch at the opposite end decreases the value.

Zones 507 and 508 are hover and proximity sensors, configured to detect objects that are opposite but not touching the steering wheel. One example application detects when a driver enters the vehicle. This can wake up the system and display a greeting message to the driver. In some embodiments of the present invention, these sensors detect a distance between the driver and the wheel, inter alia, in order to adjust the driver's air bags according to this distance; namely, a larger distance requires a greater degree of inflation.

An additional two hover and proximity sensors (not numbered) are shown on the left connecting member 403. In some embodiments of the present invention, these zones are also configured to detect touch gestures. Another application for zones 507 and 508 is to select a user input mode. For example, zone 502 has two associated applications: a music library and a radio station selector. Hand-slide or sweep gestures along zone 502 either browse the music library or scan radio channels depending on the active mode. The active mode is toggled or selected by touching one of zones 507 and 508. For example, a tap on zone 508 activates music library mode and a tap on zone 507 activates radio mode. Alternatively, a right-to-left wave gesture above zones 507 and 508 activates music library mode, and a left-to-right wave gesture above zones 507 and 508 activates radio mode.

In general, the different zones are coordinated to provide fluent and flexible navigation for a plurality of applications. The user selects an application by interacting with zones 507 and 508 and each of the other zones 501-506 is assigned an aspect of the active application. Each time an application is selected, an image of the steering wheel appears on the dashboard indicating which command is associated with each of the input zones.

Figure 3:
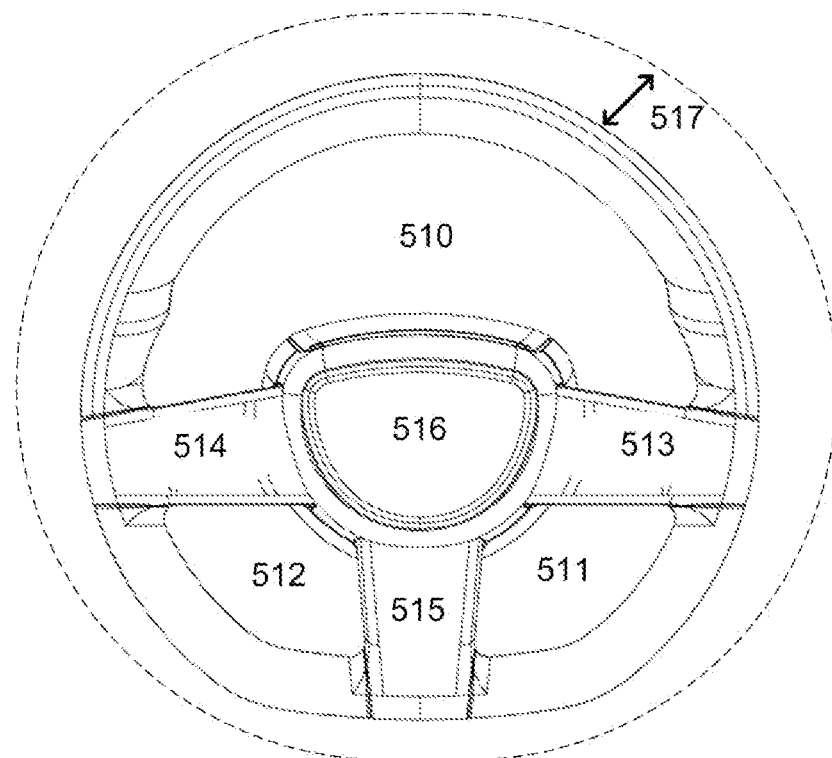
FIG. 3 is a simplified illustration of a second embodiment of a steering wheel having multiple detection zones, in accordance with an embodiment of the present invention.

Reference is made to FIG. 3, which is a simplified illustration of a second embodiment of a steering wheel having multiple detection zones, in accordance with an embodiment of the present invention. The multiple detection zones for user input are indicated by numbers in the figure. Detection properties for each zone are listed below.

Zones 510-512 are air gaps in the steering wheel. A two-dimensional grid of light beams is projected into each air gap to detect any object inserted therein.

Figure 4:
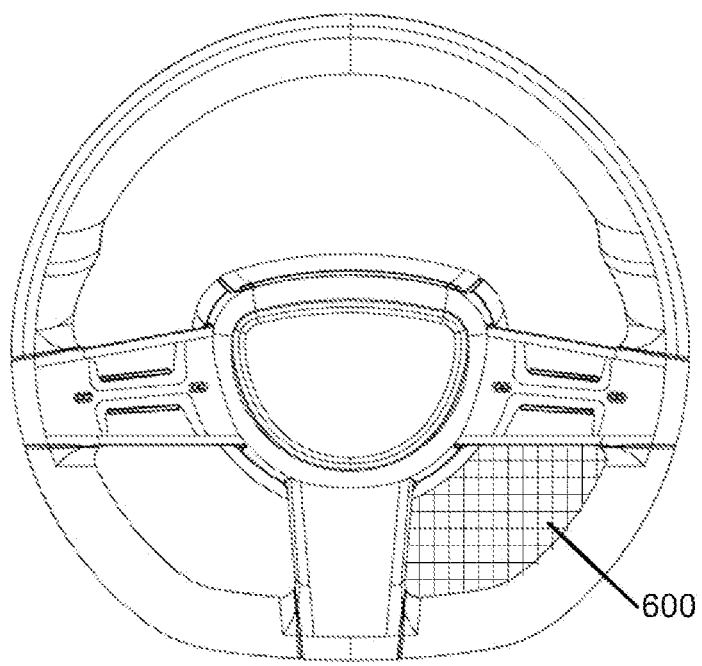
FIG. 4 is a simplified illustration of a bidirectional light grid, namely, horizontal and vertical light beams, for detecting objects inserted into a hollow portion of the steering wheel of FIG. 3, in accordance with an embodiment of the present invention.

Reference is made to FIG. 4, which is a simplified illustration of a bidirectional light grid, namely, horizontal and vertical light beams, for detecting objects inserted into a hollow portion of the steering wheel of FIG. 3, in accordance with an embodiment of the present invention. Shown in FIG. 4 is a light-beam grid 600 in zone 511.

In some embodiments more than one layer of light beams is projected into each air gap to provide a series of detections at different points along the thickness of the air gap.

Figure 5:
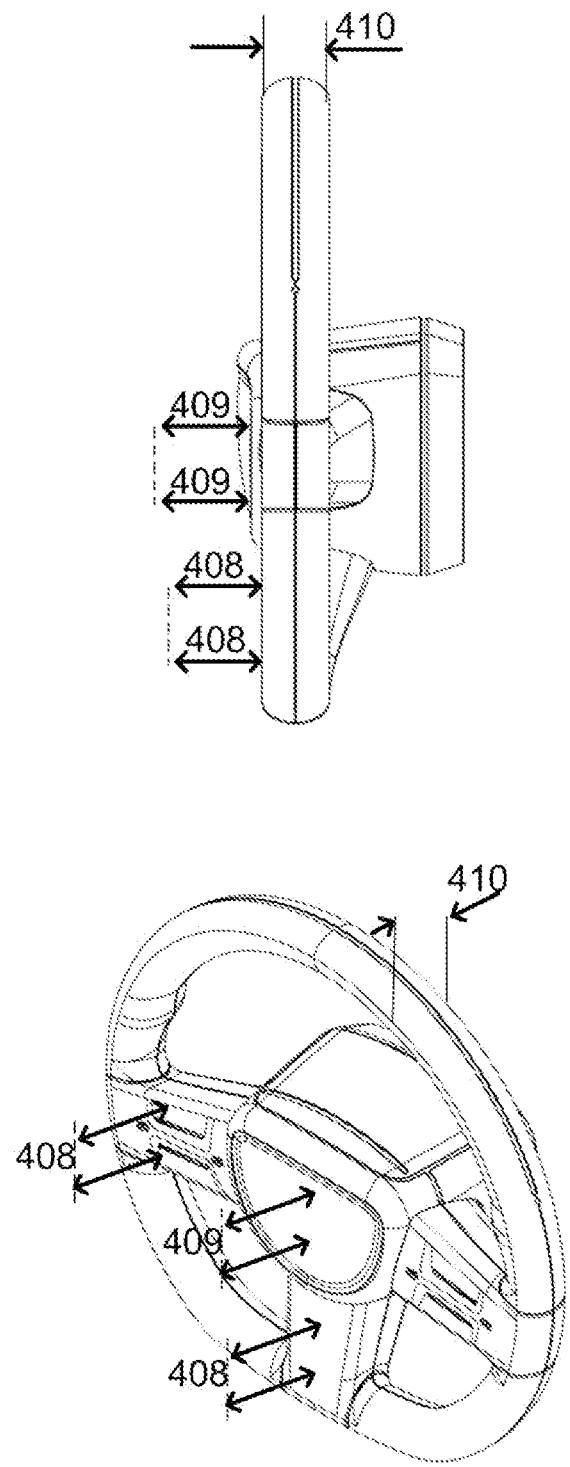
FIG. 5 is a simplified side view and profile view of the steering wheel of FIG. 3, in accordance with an embodiment of the present invention.

Reference is made to FIG. 5, which is a simplified side view and profile view of the steering wheel of FIG. 3, in accordance with an embodiment of the present invention. FIG. 5 shows the steering wheel of FIGS. 3 and 4 in profile view and at an angle from above the wheel's upper right corner. Both views indicate thickness 410 of gripping member 401 along which the multiple light grids are stacked. This enables detecting an angle at which an object is inserted into the air gap. A full explanation of multiple detection layers and their use for z-axis coordinate detection is provided in U.S. Pat. No. 8,416,217 for LIGHT-BASED FINGER GESTURE USER INTERFACE, the contents of which are incorporated herein by reference.

Returning to FIG. 3, detection zone 517 is a hovering space surrounding the outer perimeter of the steering wheel. Objects that enter zone 517 are detected by sensors embedded in the gripping member of the steering wheel.

Zones 513-515 detect the position of one or more objects touching, or in close proximity to, these zones. The range of proximity detection is indicated in FIG. 5 by nominal range 408. In some embodiments zones 513-515 are also adapted to detect an amount of pressure applied by a touch object.

Zone 516 detects the position of one or more objects touching, or in close proximity to, it. The range of proximity detection is indicated in FIG. 5 by nominal range 409. In some embodiments zone 516 is also adapted to detect an amount of pressure applied by a touch object.

In order to avoid inadvertent input to the detection zones while steering the vehicle, the touch-sensitive input system is activated only under particular conditions. For example, in order that the system register touch input the user first performs a specific touch gesture on one or more of the detection zones. As another example, the user must activate a toggle switch located away from the steering wheel before the detection zones register user input. Yet another example is that the position of the steering wheel enables touch input to be registered. For example, only when the steering wheel is in the "twelve o'clock" or neutral position the system registers input from the detection zones, whereas once the wheel is rotated a given number of degrees from the neutral position, the system actively monitors the detection zones but does not generate input to other devices.

A few use cases will demonstrate the user interface of the present invention. A first use case is adjusting the volume in the car stereo.

Figure 6:
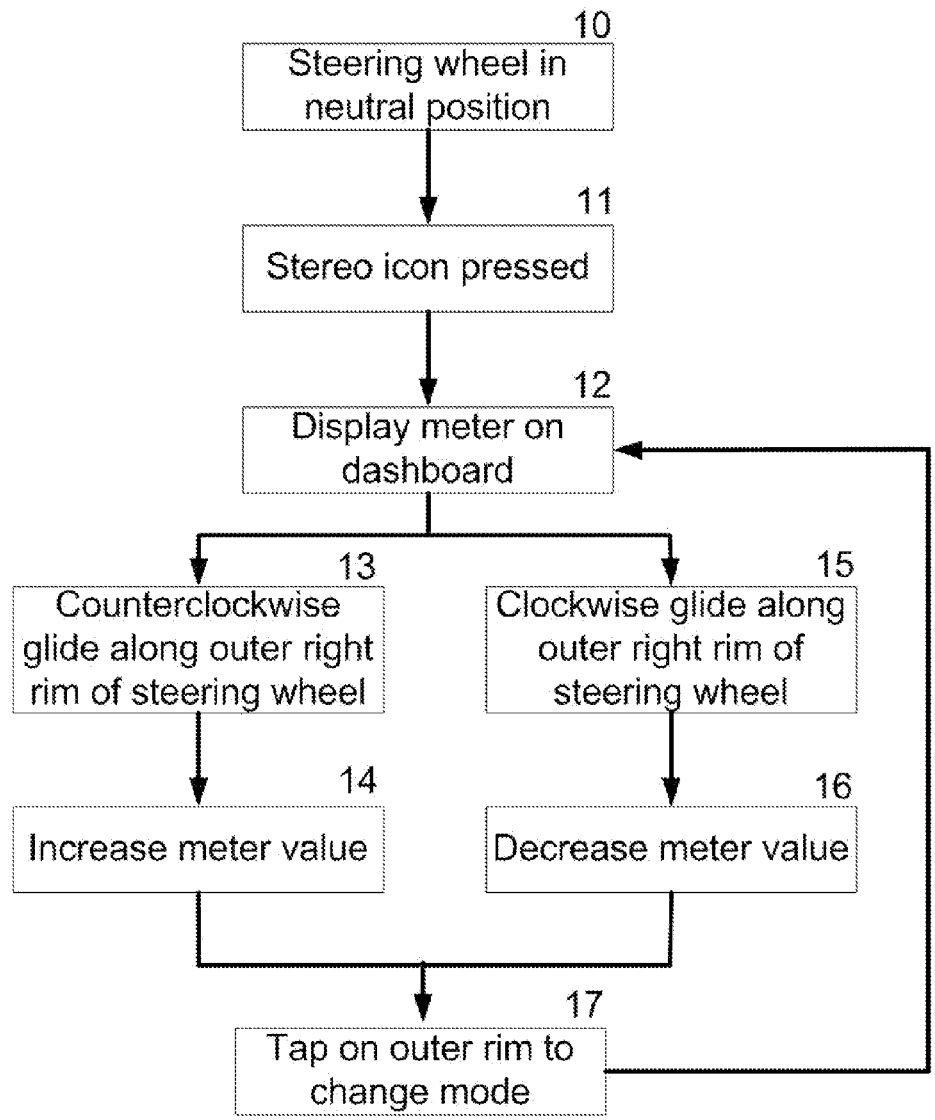
FIG. 6 is a flow chart describing a sequence of user interface events for adjusting car stereo controls, in accordance with an embodiment of the present invention.

Reference is made to FIG. 6, which is a flow chart describing a sequence of user interface events for adjusting car stereo controls, in accordance with an embodiment of the present invention. At step 10 the steering wheel is in neutral position to enable touch input. At step 11 the driver presses a location in zone 513 that activates controls for the entertainment system. The first parameter to be adjusted by the controls is the volume. At step 12 a volume meter is presented on a display device such as a dashboard display or HUD. The driver adjusts the volume level by performing a hand-slide or sweep gesture along the right outer rim of the steering wheel, i.e., the right section of zone 517. Steps 13-16 show that a counter-clockwise gesture along the right hand side of detection zone 517 increases the volume, and a clockwise gesture along this zone decreases the volume. This counterclockwise gesture can be performed by raising the driver's right hand along the steering wheel. At step 17 one or more taps on the outside of the steering wheel (zone 517) puts the input system into a different mode, e.g., to adjust the bass or treble. The system then returns to step 12 where it displays a meter relevant for the active mode, e.g., bass or treble, instead of volume. While the right hand is performing gestures that activate system functions, the left hand can perform additional gestures in the detection zones that do not interfere with the right hand gestures. In some instances these left hand gestures do not generate any commands.

A second use case is text input of an address to a vehicle navigation system.

Figure 7:
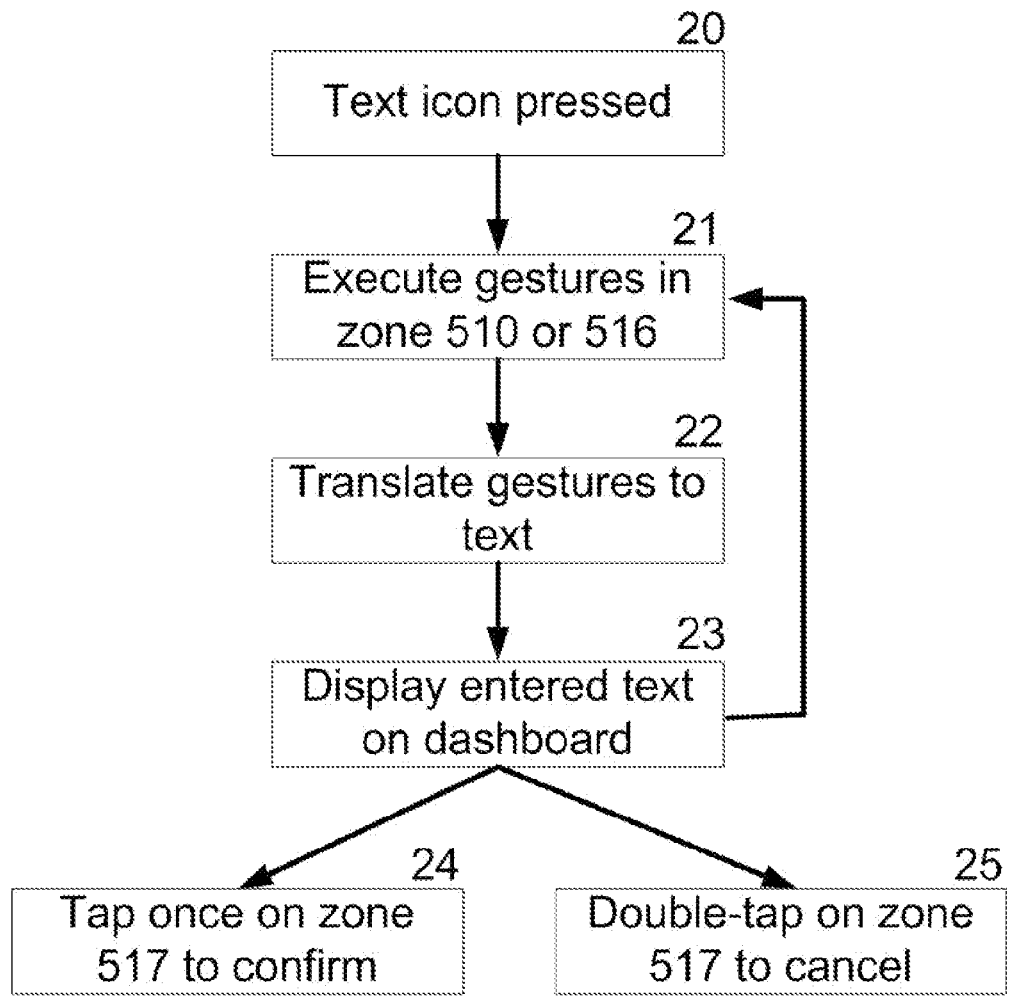
FIG. 7 is a flow chart describing a sequence of user interface events for entering text, in accordance with an embodiment of the present invention.

Reference is made to FIG. 7, which is a flow chart describing a sequence of user interface events for entering text, in accordance with an embodiment of the present invention At step 20 the driver presses a location on zone 514 marked by a text input symbol to activate text input mode. At steps 21 and 22, gestures inside zone 510 are interpreted as characters or symbols. Alternatively, characters are input by finger or stylus glide gestures on the surface of zone 516. At step 23 the entered text is displayed on the dashboard or HUD. Steps 21-23 continue in a loop until the displayed text forms a name or word (or portion thereof). To confirm the input, the driver taps once on the outer rim of the steering wheel (zone 517) as indicated by step 24. To delete or reject the input, the driver double-taps on the outer rim of the steering wheel (zone 517) as indicated by step 25. The system operates independently of right/left handedness.

A third use case is an image viewer.

Figure 8:
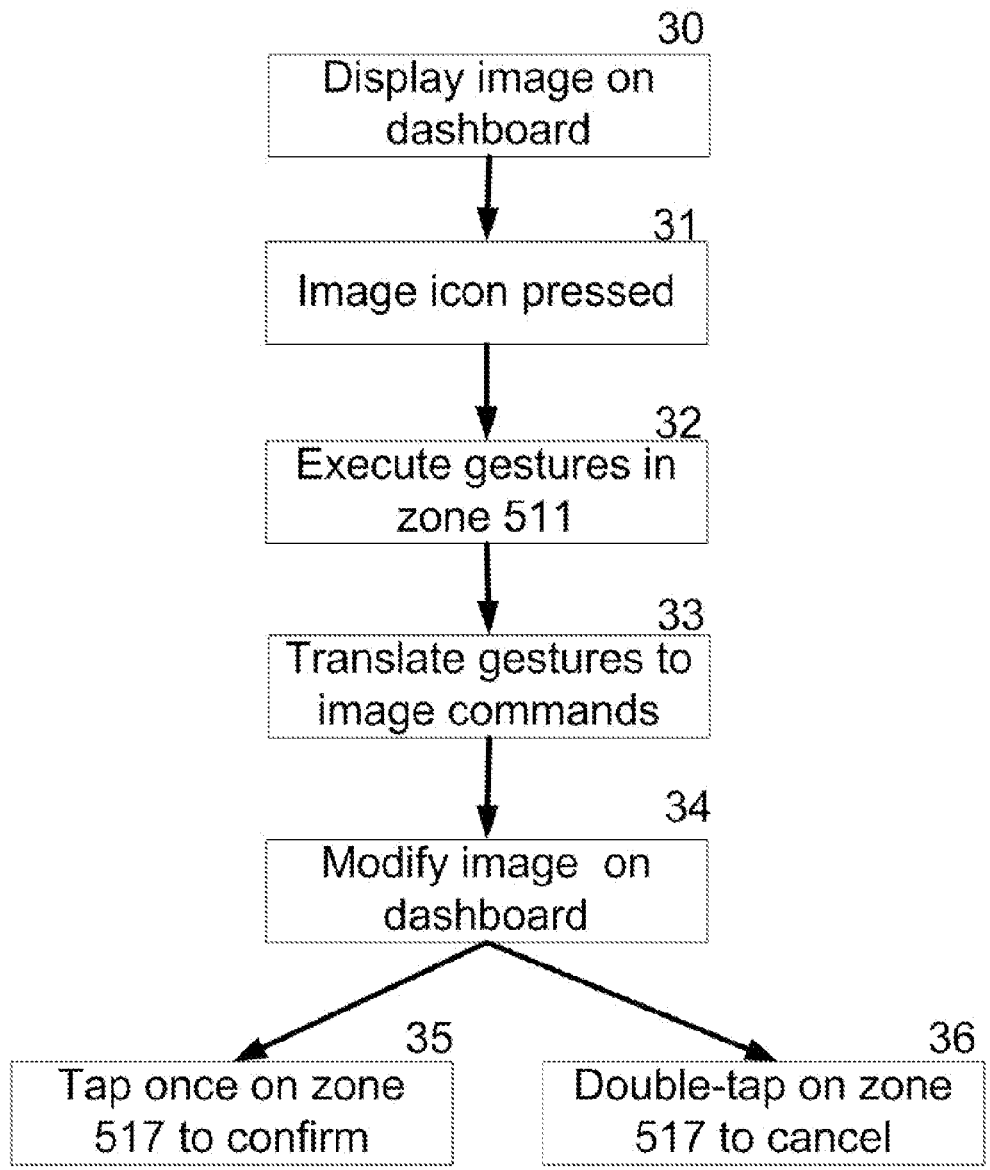
FIG. 8 is a flow chart describing a sequence of user interface events for manipulating an image displayed on a car dashboard, in accordance with an embodiment of the present invention.

Reference is made to FIG. 8, which is a flow chart describing a sequence of user interface events for manipulating an image displayed on a car dashboard, in accordance with an embodiment of the present invention. At step 30 an image is displayed on the dashboard. Alternatively, this image is displayed on an HUD. This image may be a map, a rear-view camera viewfinder image or any other image. At step 31 the driver activates image manipulation mode, e.g., by tapping a location on zone 515 marked by an image symbol. At steps 32-34 hand movements in detection zone 511 are interpreted as image manipulation commands. These commands include panning, zooming and rotating the image. The hand movements supported include one-finger and multi-finger translation gestures, and two-finger pinch, two-finger spread and two-finger rotation gestures. Further hand movements supported include full-hand spreads, whereby a user spreads all fingers on one hand inside the air gap. Other supported gestures include full-hand pinch gestures, which begin when all fingertips of one hand are not touching each other, and the user draws his fingertips together. When multiple layers of light-beam guides provide z-axis detection, tilt gestures are also supported. A tilt gesture uses the angle at which a finger is inserted through air gap 511 as one of the gesture attributes. A full discussion of supported gestures and commands is included in the aforementioned U.S. Pat. No. 8,416,217 for LIGHT-BASED FINGER GESTURE USER INTERFACE. The driver taps once on the outer rim of the steering wheel (zone 517) to accept an input, as indicated at step 35, and taps twice on the outer rim of the steering wheel (zone 517) to cancel an input as indicated at step 36. This system operates independently of right/left handedness.

Discussion now turns to implementing sensors for each of the various detection zones. Generally speaking, a light-based touch or proximity sensor includes a light transmitter and a light receiver, and is based on the principle that an object such as a finger placed on or near the sensor changes the coupling of light between the transmitter and the receiver. Thus, a channel that conducts signals between the transmitter and the receiver indicates whether there is a touch inside the channel. There are two types of channels; namely, A. channels for which a finger activates a signal between the transmitter and the receiver; and B. channels for which a finger blocks a signal between the transmitter and the receiver.

For channels of type A, a low signal, near 0, indicates no touch, and a high signal indicates a touch. For channels of type B, a high signal indicates no touch, and a low signal, near 0, indicates a touch.

Figure 9:
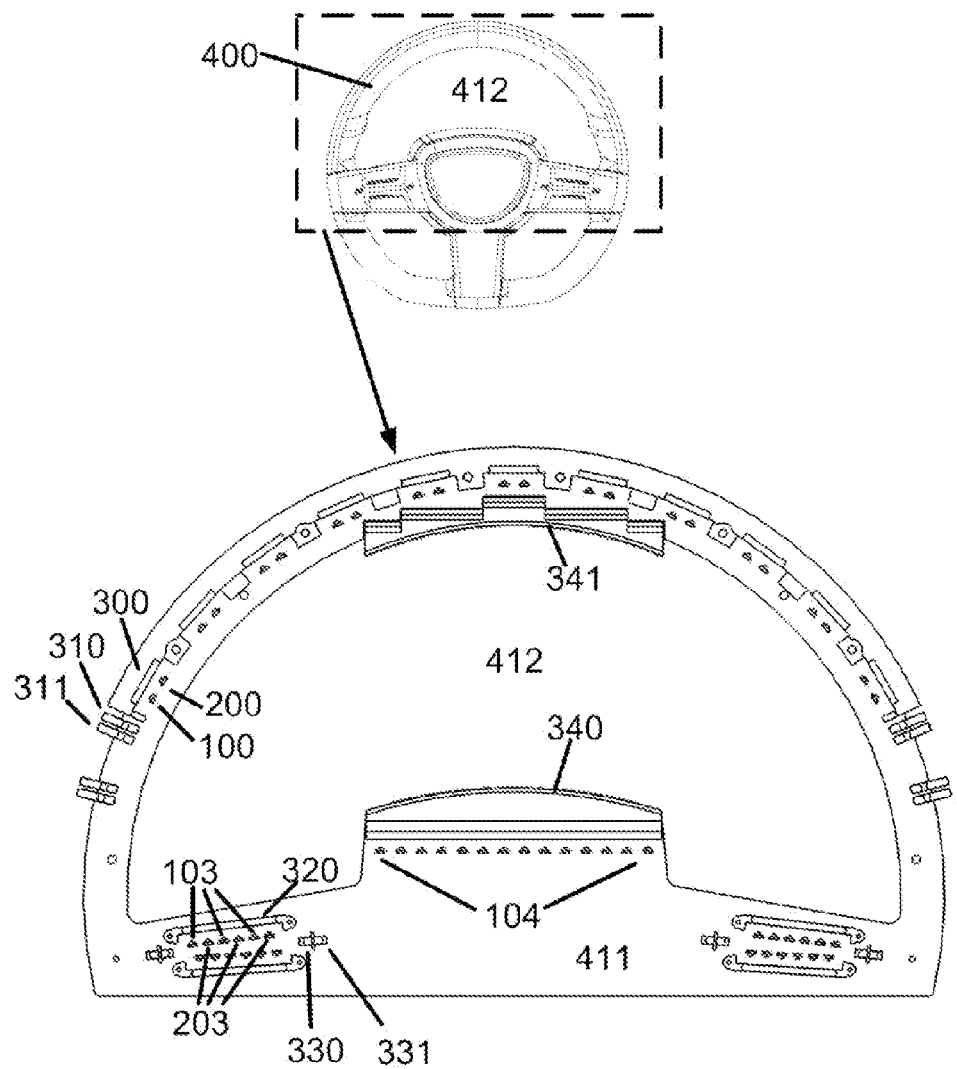
FIGS. 9-11 are simplified illustrations of a PCB assembly (PCBA) in a steering wheel, in accordance with an embodiment of the present invention.
Figure 10:
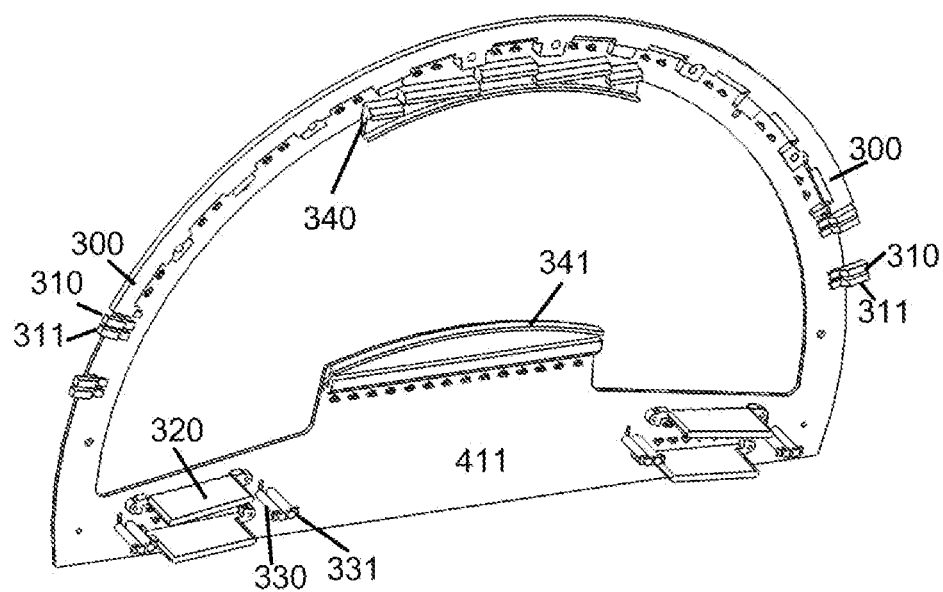
Figure 11:
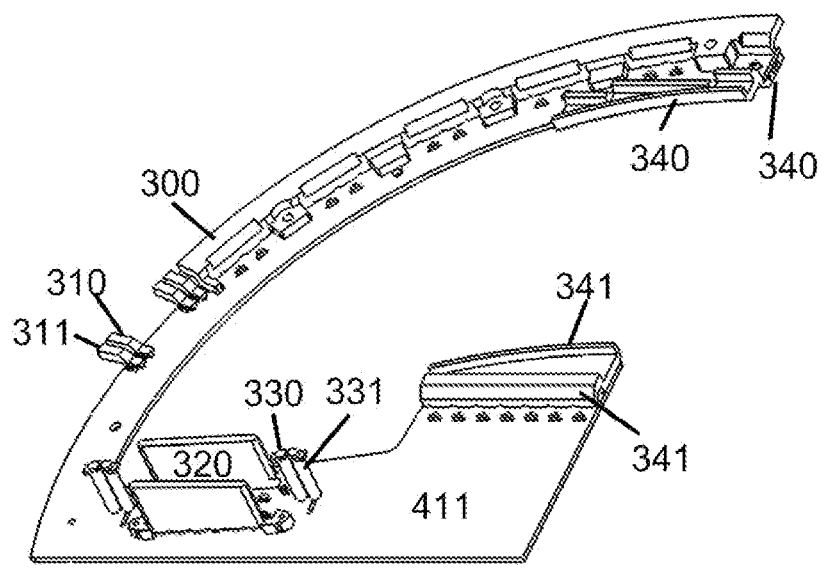

Reference is made to FIGS. 9-11, which are simplified illustrations of a PCB assembly (PCBA) in a steering wheel, in accordance with an embodiment of the present invention. FIGS. 9-11 show a printed circuit board assembly (PCBA) 411 populated with various touch and proximity sensor components for a steering wheel 400 according to embodiments of the present invention. FIG. 9 shows the PCBA from above, FIG. 10 shows the PCBA rotated, and FIG. 11 shows a cross-sectional view, to show the three-dimensional features of the light guides. The embodiment illustrated in FIGS. 9-11 includes five different sensor systems.

A first sensor system provides detection zones 507 and 508 in FIG. 2. Each sensor in this first system includes a pair of light guides 330 and 331, as shown in FIGS. 9-11. Light guide 330 is coupled to a transmitter (not shown) and light guide 331 is coupled to a receiver (also not shown). When a driver hovers his hand above one of these sensors he generates a high signal as his hand reflects light from light guide 330 back into light guide 331. This is a type A channel. In some embodiments similar sensors placed along spokes 402-404 that connect the gripping member 401 of wheel 400 to the steering column 407 are used to provide detection zones 513-515 in FIG. 3. Similar sensors placed inside steering column 407 of wheel 400 also provide detection zone 516 in FIG. 3, in certain embodiments of the invention.

A second sensor system provides detection zones 505 and 506 in FIG. 2. Each sensor in this second system includes an alternating row of transmitters 103 and receivers 203, coupled to a light guide 320, as shown in FIGS. 9-11. When a driver touches the upper edge of light guide 320 he generates a high signal as his touch reflects light from one or more of transmitters 103 onto a respective one or more neighboring receivers 203. This too, is a type A channel. In some embodiments similar sensors placed along the spokes 402-404 that connect the gripping member 401 of wheel 400 to the steering column 407 are used to provide detection zones 513-515 in FIG. 3. Similar sensors placed inside steering column 407 of wheel 400 also provide detection zone 516 in FIG. 3, in certain embodiments of the invention.

A third sensor system provides detection zone 501 in FIG. 2. This system includes a row of emitters 104 that project collimated light beams across opening 412 with the aid of collimating light guide 340. A row of receivers (not shown) at the opposite end of opening 412 receives the collimated light beams with the aid of a second collimating light guide 341 embedded in the gripping member 401 of wheel 400. When a driver inserts a hand or finger into the active detection zone 501 in opening 412, he generates a low signal as his hand or finger blocks a portion of the collimated light beams. This is a type B channel.

The illustrated third sensor system features vertical collimated light beams and detects objects along only one axis. In some embodiments, an additional, similar sensor system embedded in the left and right portions of gripping member 401 is added to project horizontal collimated beams across opening 412. In this case, the two sets of orthogonal collimated beams provide two-dimensional (2D) detection of inserted objects. In some embodiments, similar sets of orthogonal beams are used in openings 511 and 512 of FIG. 3 to provide 2D detection as illustrated by light grid 600 in FIG. 4.

A fourth sensor system includes two sensors along each side of steering wheel 400. These sensors provide detection zones 503 and 504 in FIG. 2. Each sensor in this fourth system includes a pair of light guides 310 and 311, as shown in FIGS. 9-11. Light guide 310 is coupled to a transmitter (not shown) and light guide 311 is coupled to a receiver (also not shown). When a driver hovers his hand opposite one of these sensors he generates a high signal as his touch reflects light from light guide 310 back into light guide 311. This is a type A channel. In some embodiments, similar sensors are placed around the entire wheel to provide detection zone 517 in FIG. 3.

A fifth sensor system includes a series of sensors along the upper outer rim of steering wheel 400. These sensors provide detection zone 502 in FIG. 2. Each sensor in this fifth system includes a transmitter 100, a receiver 200 and a light guide 300. A driver touching the outer rim of the wheel opposite one of these sensors generates a high signal as his touch reflects light from emitter 100 back onto receiver 200. Therefore this is a type A channel. Similar sensors placed around the entire wheel can be used to provide detection zone 22 in FIG. 3.

In some embodiments of the present invention, in addition to the near-infrared light used for the sensors, visible light elements are also embedded in the steering wheel, to light up the various detection zones. The visible light elements are used, inter alia, in order to illuminate a hand inside zones 510-512, or to follow hand movements insides zones 510-512 or along zones 502-506, so as to provide visible feedback to the driver who is interacting with the sensors.

The type A channel sensor systems described hereinabove detect light from the transmitter reflected off the driver's finger or hand onto a nearby receiver. The maximum distance that this type A sensor can detect is defined as the sensor's "nominal range". In some embodiments, the different sensor systems have different nominal ranges. For example, when the second and fifth sensor systems are designed to be used as a touch switch or slider control, they are adjusted to a very short nominal range. Similarly, when the first and fourth sensor systems are designed to detect hover gestures in the air above or opposite the sensor, they are adjusted to a nominal range of several inches. And when the first system is designed to detect a driver entering the car it is adjusted to a very large nominal range.

There are several ways to adjust the nominal range, based inter alia on the intensity of the transmitter, on the detection threshold used to decide whether an object is present in the channel, and on the light guide. Specifically, when the light guide absorbs a portion of the light in the detection channel the sensor has a shorter nominal range.

The first sensor system, used for detection zones 507 and 508, is now addressed in detail.

Figure 12:
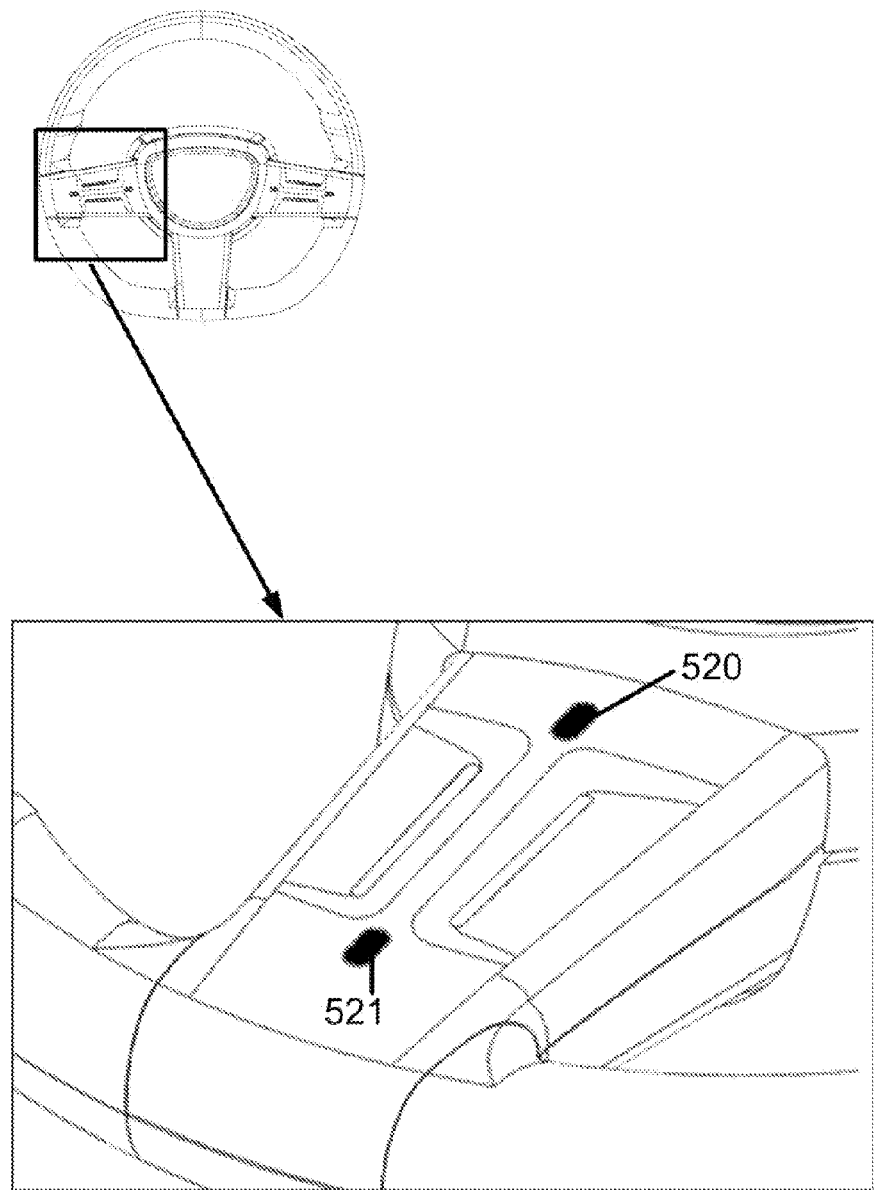
FIGS. 12-16 are simplified diagrams of proximity sensors on a steering wheel, in accordance with an embodiment of the present invention.
Figure 13:
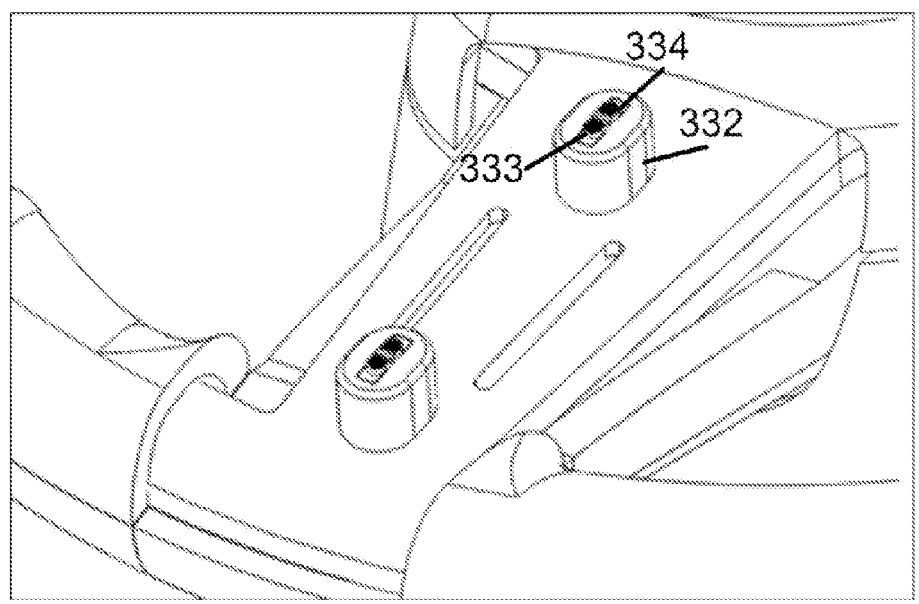
Figure 14:
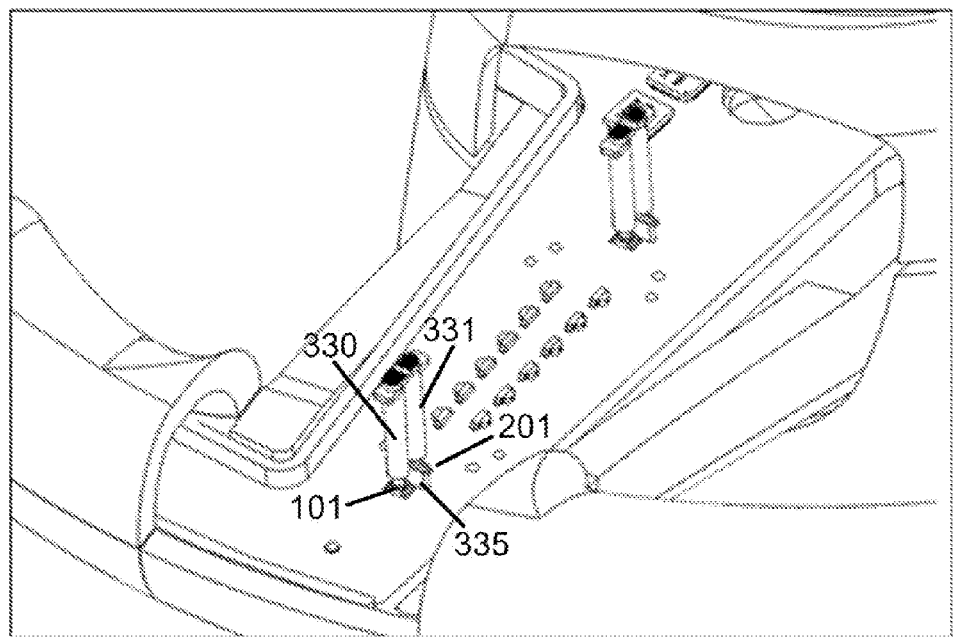
Figure 15:
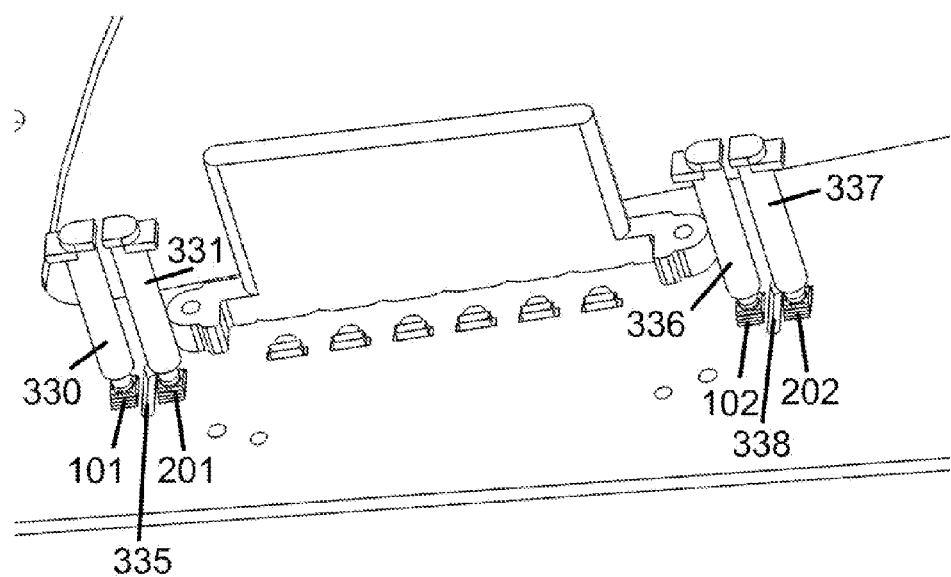

Reference is made to FIGS. 12-16, which are simplified diagrams of proximity sensors on a steering wheel, in accordance with an embodiment of the present invention. FIGS. 12-15 show layers of components that form sensors 520 and 521. FIG. 12 shows proximity sensors 520 and 521 as seen by a driver. FIG. 13 shows proximity sensors 520 and 521 with the upper steering wheel casing layer removed. As seen in FIG. 13, these proximity sensors feature a supporting column 332 having a transmitter light guide upper surface 333 and a receiver light guide upper surface 334 at the top of the column. In FIG. 14 column 332 is removed, exposing upward facing transmitter 101 directly beneath light guide 330, upward facing receiver 201 directly beneath light guide 331, and light barrier 335 between transmitter 101 and receiver 201 to prevent scattered light from transmitter 101 from reaching receiver 201. FIG. 15 is another view of the elements in both proximity sensors 520 and 521: transmitters 101 and 102, receivers 201 and 202, light guides 330, 331, 336 and 337 and light barriers 335 and 338. Light guides 330, 331, 336 and 337 are adapted to use total internal reflection (TIR) to maximize the amount of light in this detection channel.

Figure 16:
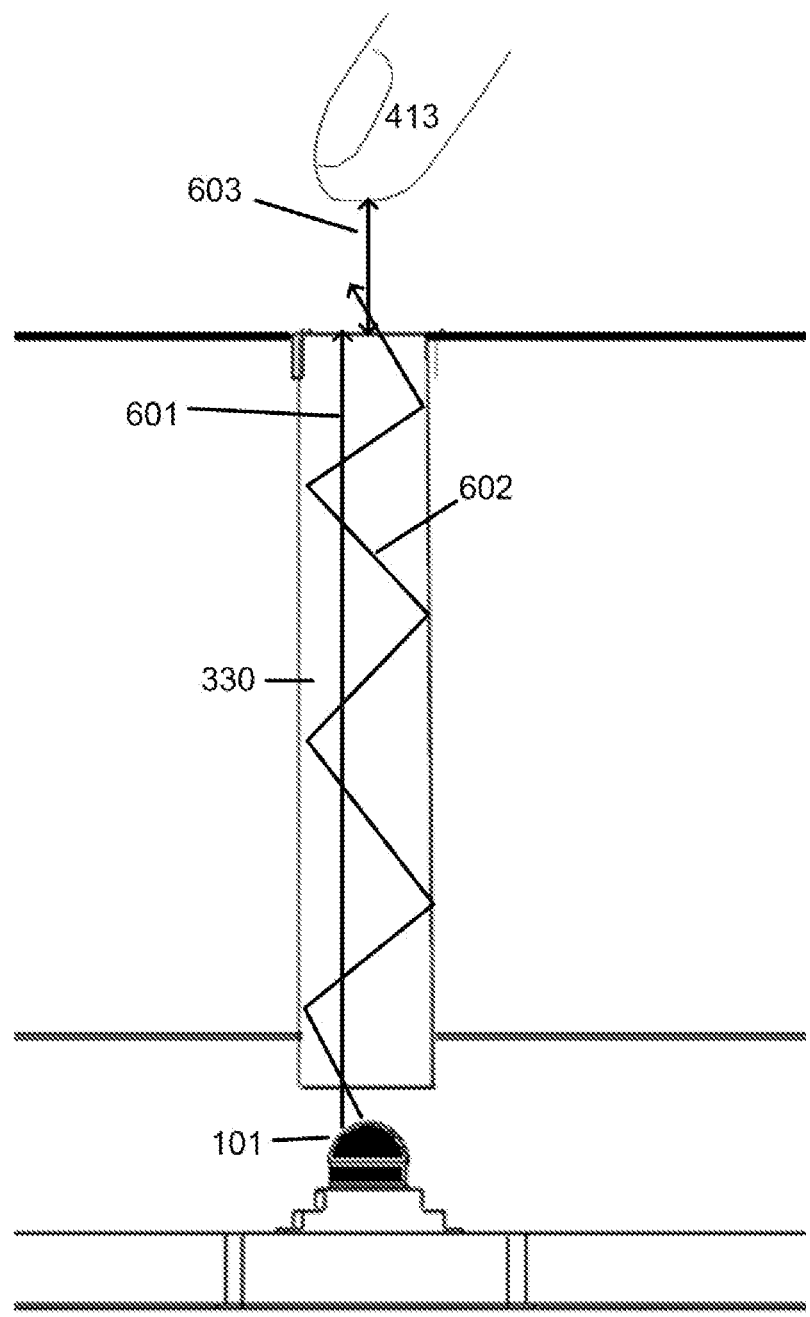
Figure 17:
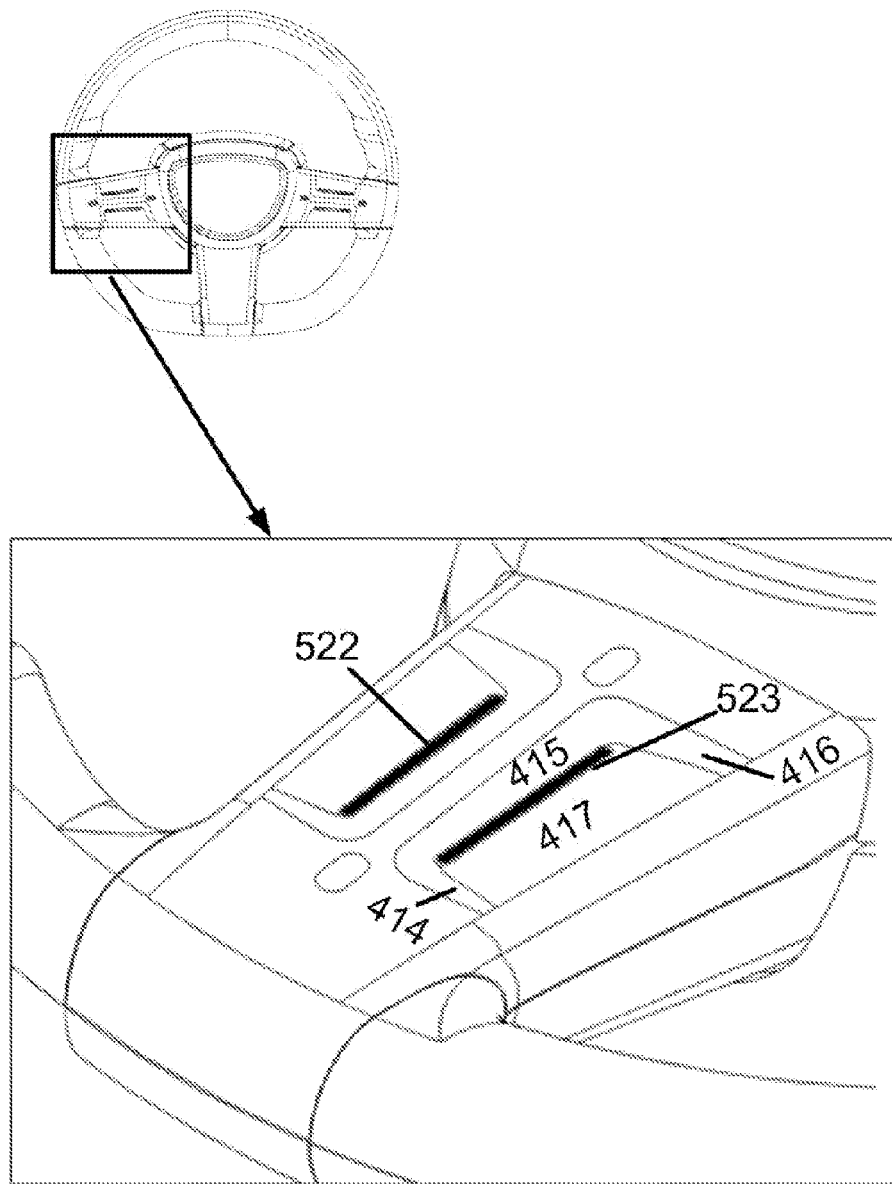
FIGS. 17-20 are simplified illustrations of slider controls embedded in a steering wheel, in accordance with an embodiment of the present invention.

The operation of sensors 520 and 521 is illustrated in FIG. 16 showing emitter 101 sending a direct light beam 601 and a TIR beam 602 through light guide 330 out above the sensor. A finger 413 hovering above the sensor reflects a portion of the emitter beam back into neighboring light guide 331 and onto receiver 201, as illustrated by two-sided arrow 603. Light guide 331 and receiver 201 are not shown in FIG. 16.

The second sensor system, adjusted to a very short nominal range and used for zones 502, 505 and 506, is now addressed in detail.

Reference is made to FIGS. 17-20, which are simplified illustrations of slider controls embedded in a steering wheel, in accordance with an embodiment of the present invention. FIGS. 17-20 show layers of components that form slider controls 522 and 523. In the illustrated embodiment each of these slider controls is situated inside a gently sloping recessed cavity to facilitate gliding a finger along the control without taking eyes off the road. A first recessed cavity is formed by inclined surface 417 surrounded on three sides by walls 414-416. Slider control 523 is located along the boundary joining surface 417 to wall 415.

Figure 18:
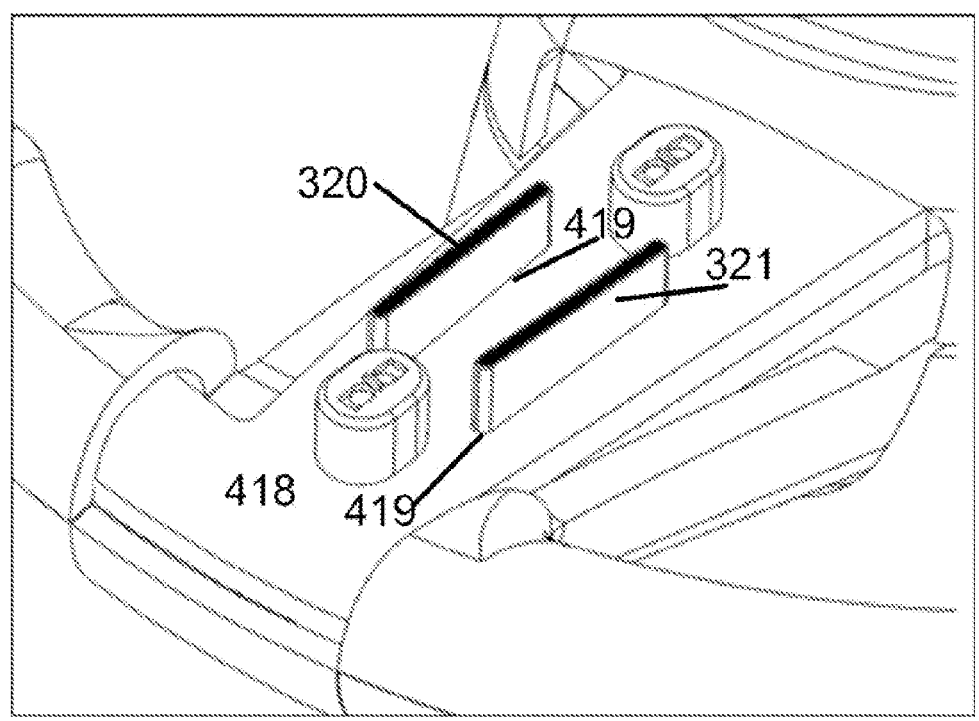

FIG. 18 shows that the exposed surface of slider controls 522 and 523 is the long, thin, top surface of upright light guides 320 and 321. Light guides 320 and 321 are supported in their upright position by being inserted through narrow opening slots 419 in intermediate layer 418.

Figure 19:
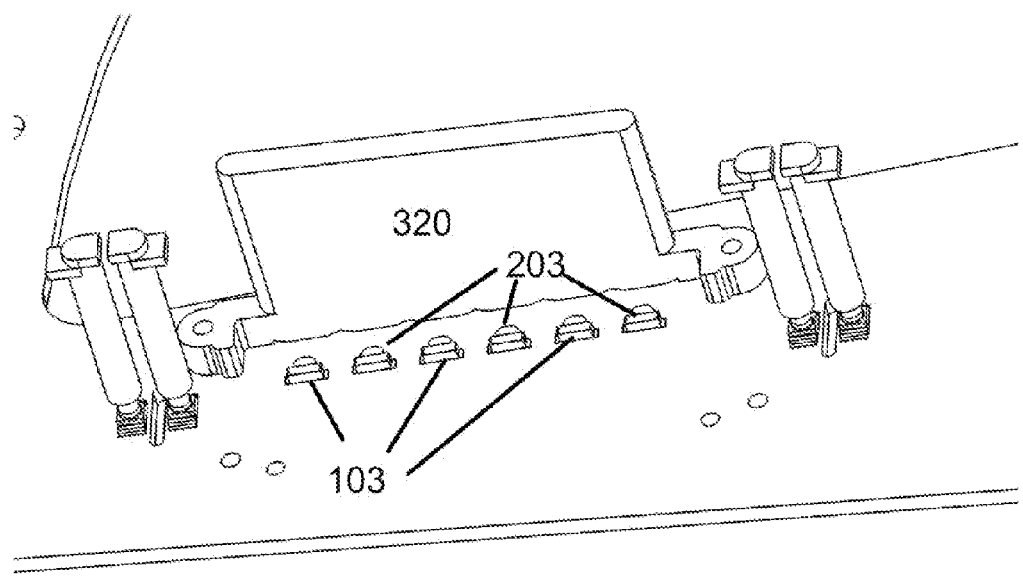

FIG. 19 shows the inner components of slider control 522 after intermediate layer 418 has been removed. Slider control 522 includes one alternating row of transmitters 103 and receivers 203, and one upright light guide 320. Slider control 522 is a linear series of detection channels where each channel has a transmitter at one end of the channel and its neighboring receiver in the alternating row of transmitters and receivers at the other end of the channel.

Figure 20:
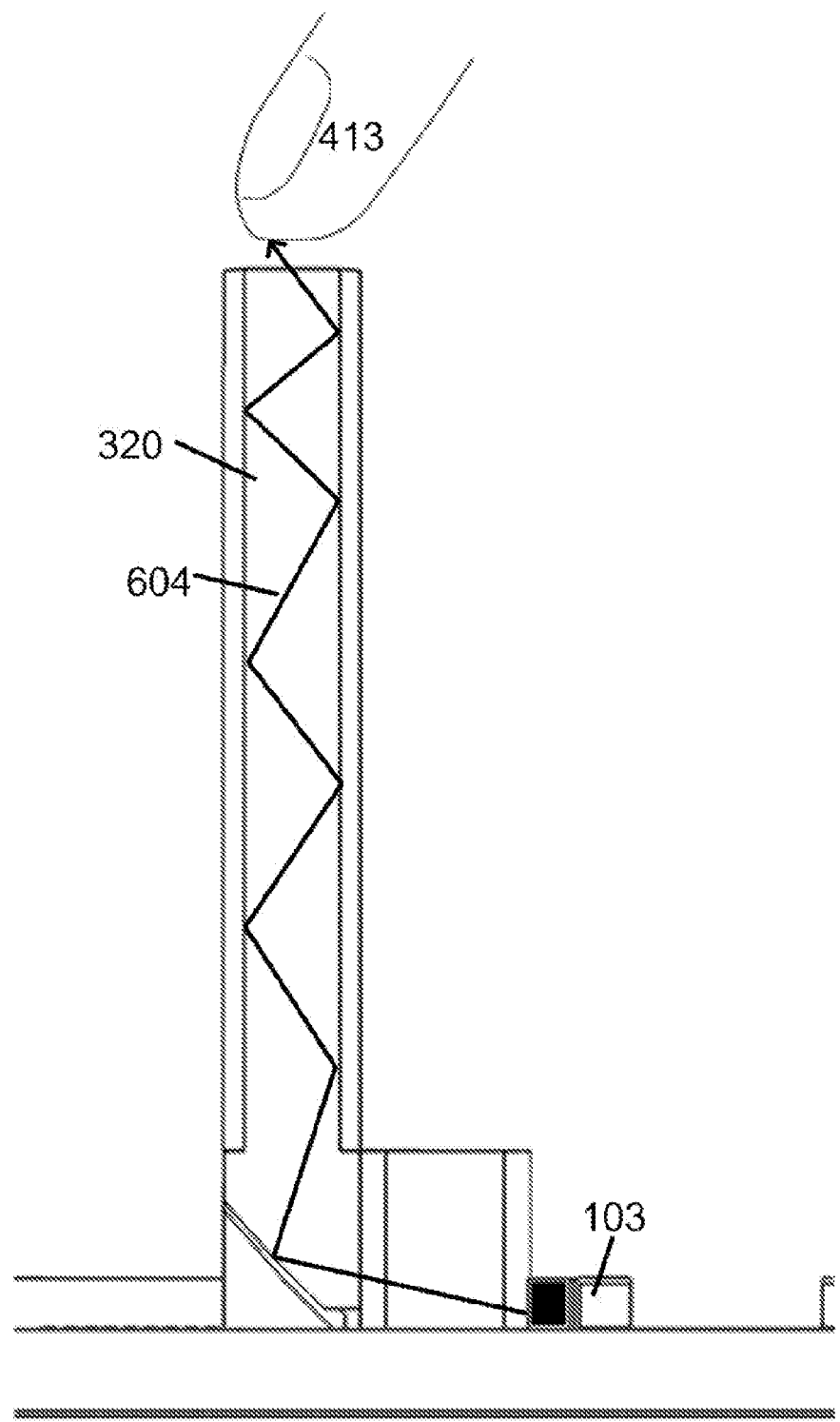

Reference is made to FIG. 20 illustrating the light beam path through this channel. Light beam 604 exits transmitter 103 and is directed upward through light guide 320. A finger 413 touching the top of light guide 320 reflects a portion of the beam back down into light guide 320. A portion of this reflected light is directed through light guide 320 onto a neighboring receiver 203 (shown in FIG. 19) completing the detection channel. As a driver's finger glides along the exposed surface of light guide 320 different detection channels are activated indicating the location of the finger along this slider control. Light guides 320 and 321 are adapted to use TIR to maximize the amount of light in the detection channels.

The type B sensor system used for zone 501 will now be discussed in detail.

Figure 21:
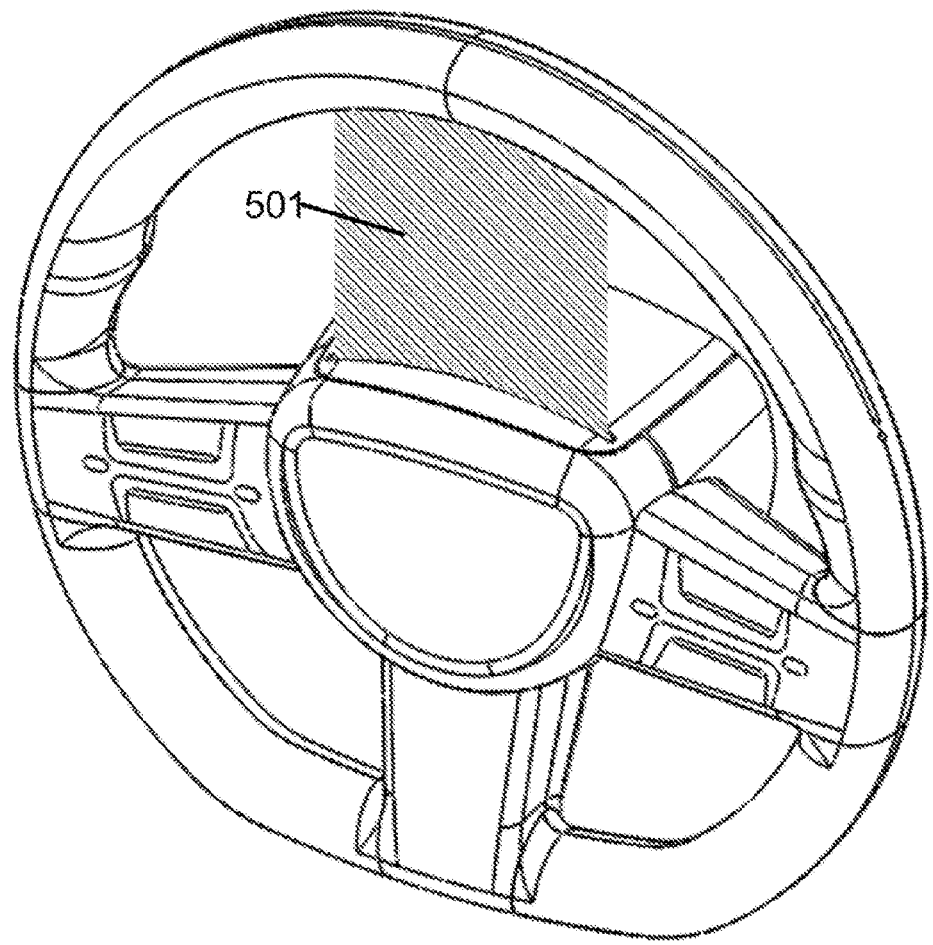
FIGS. 21-30 are simplified diagrams of sensors embedded in a steering wheel that detect gestures inside an open cavity in the steering wheel, in accordance with an embodiment of the present invention.
Figure 22:
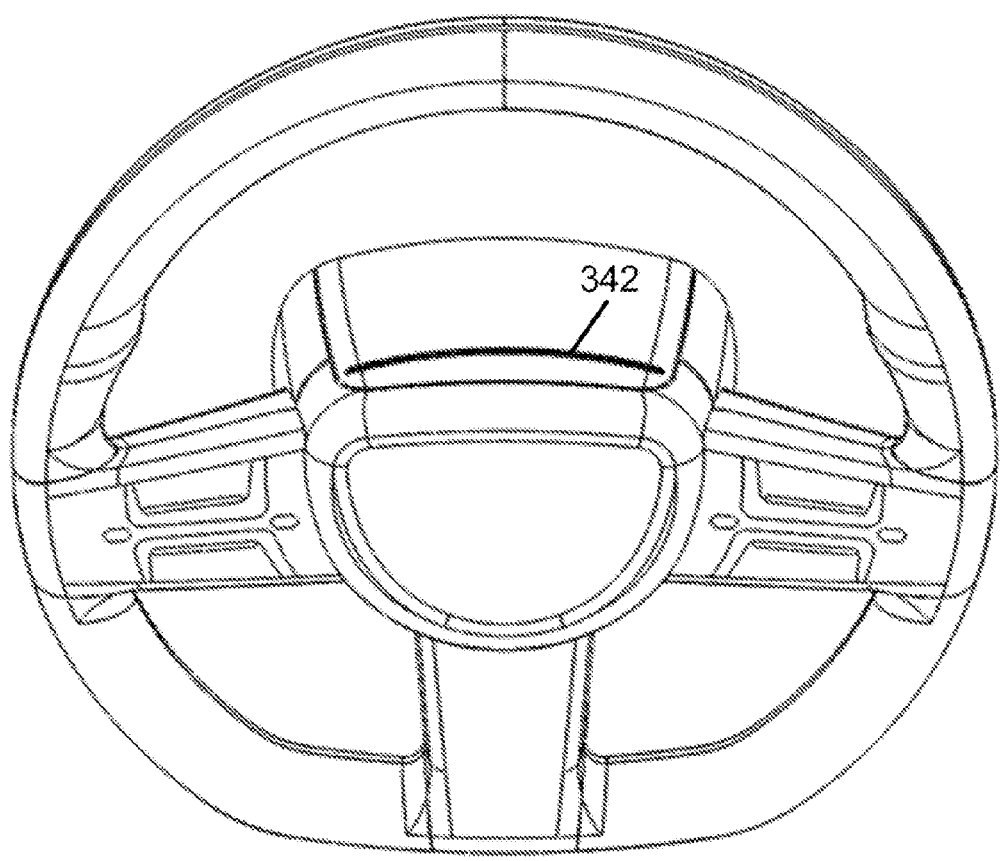
Figure 23:
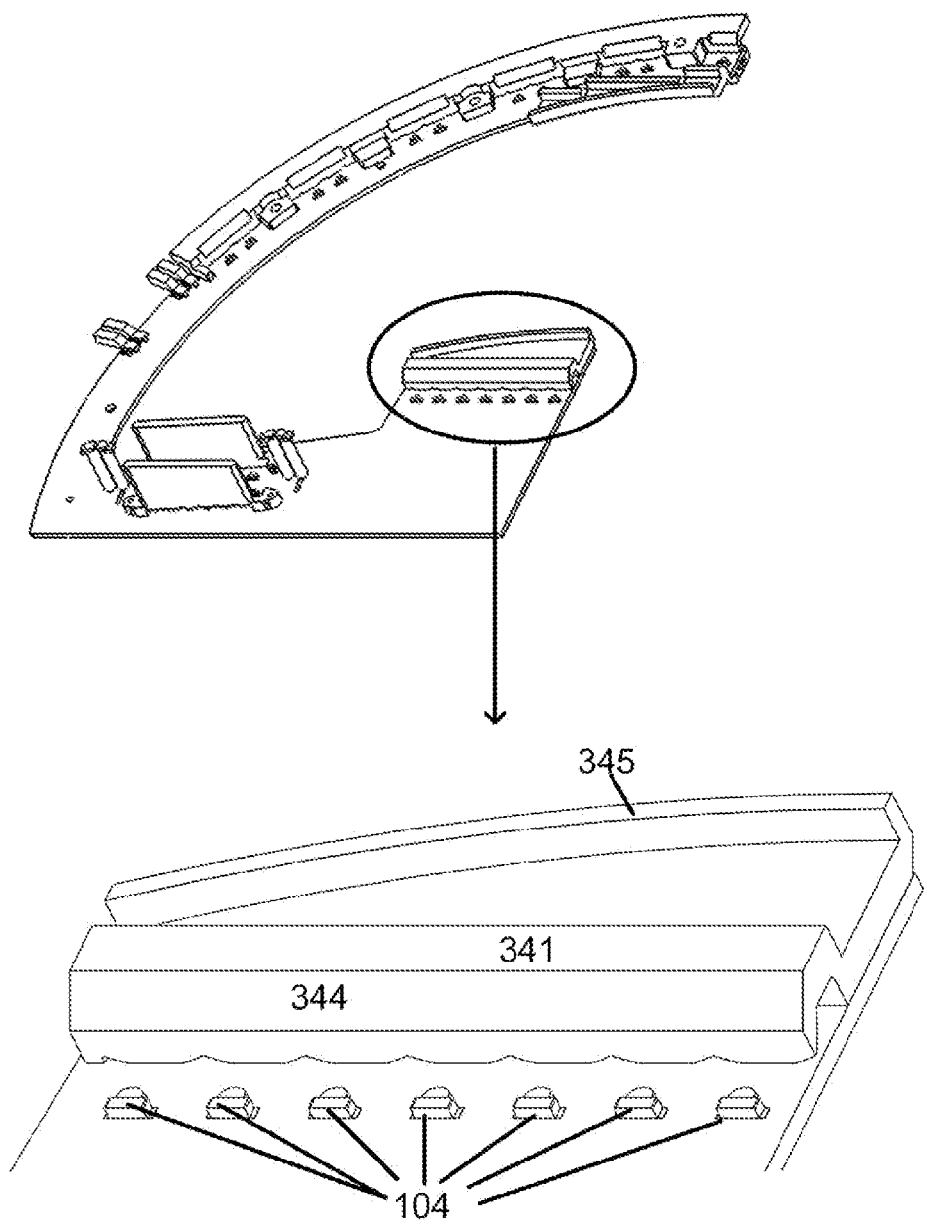

Reference is made to FIGS. 21-30, which are simplified diagrams of sensors embedded in a steering wheel that detect gestures inside an open cavity in the steering wheel, in accordance with an embodiment of the present invention. Detection zone 501 is illustrated in FIG. 21. FIG. 22 shows the exposed upper edge 342 of light guide 341 that projects light beams into zone 501. FIG. 23 shows a rotated cross section of light guide 341 and an array of transmitters 104 situated below light guide 341 in the steering column. Light guide 341 includes collimating, internally reflective elements (not shown) that collimate light inside the light guide, internally reflective facet 344, and curved window 345. Curved window 345 is required in order that this light guide follow the contours of the rounded steering column in which it is mounted. The outer surface of window 345 is exposed upper edge 342 of FIG. 22. In some embodiments of the present invention, window 345 is formed with a uniform thickness, in order to minimize the lens effect that this widow has on the sensor light beams. In some embodiments, window 345 is also formed as thin as possible, in order to minimize the distance that the light beams are shifted laterally when they pass through the window.

Figure 24:
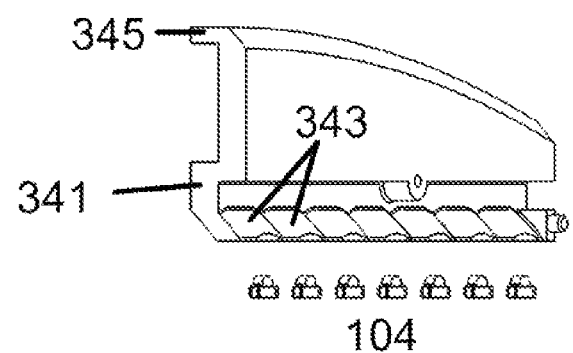
Figure 25:
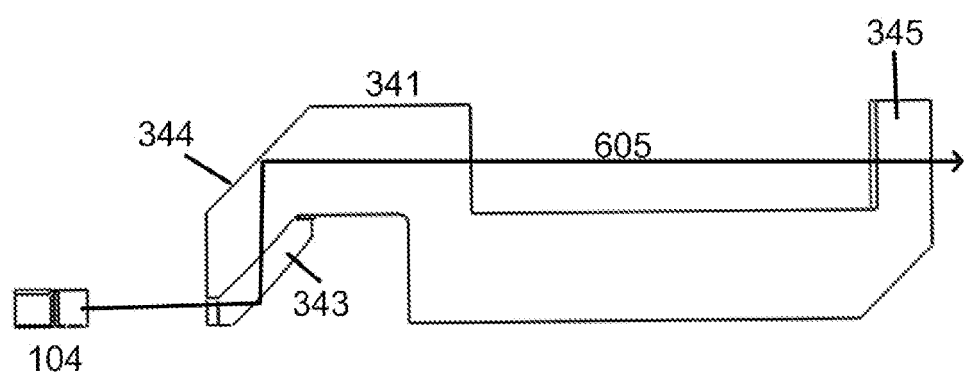

Reference is made to FIG. 24 showing light guide 341 viewed from underneath. In this view, internally reflective collimating surfaces 343 are visible. Each surface 343 collimates a wide light beam emitted by a transmitter into the light guide. In addition, surface 343 also redirects the collimated light onto internally reflective surface 344 as light beam 605 in FIG. 25 illustrates.

Figure 26:
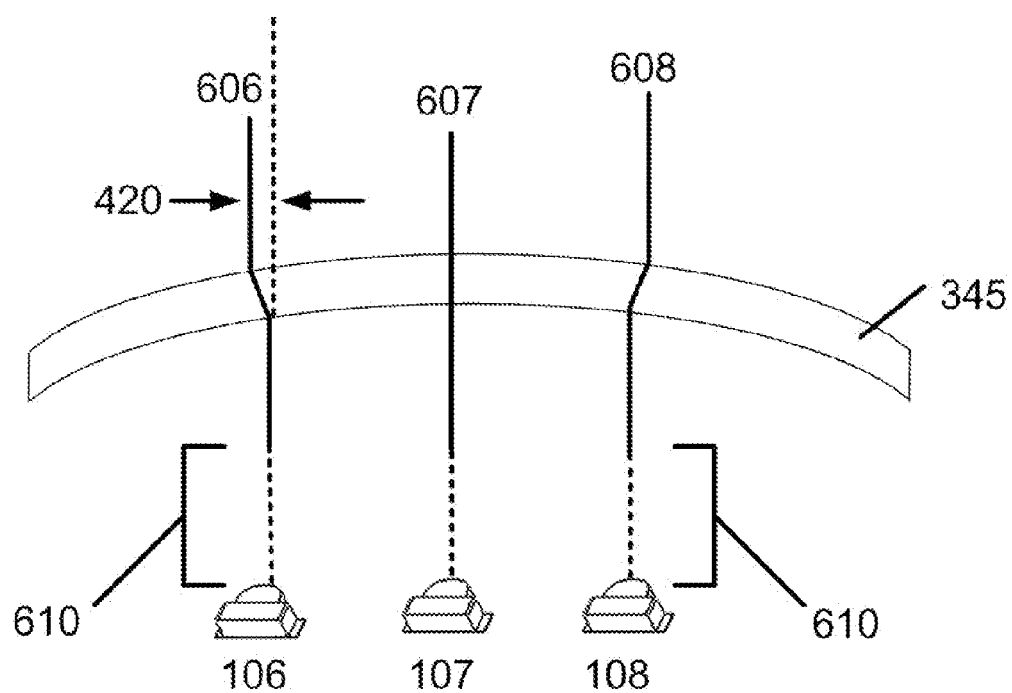

FIG. 26 shows three beams 606-608 from respective emitters 106-108, passing through lens 345. FIG. 26 illustrates how a uniform thickness and a large radius of curvature relative to the width of the beam of window 345, minimize the lens effect on three light beams 606-608. E.g., beam 606 is offset to the left of emitter 106 when it exits curved window 345, but is not redirected as a result of passing through the window. The offset for beam 606 is indicated in the figure by distance 420. When window 345 is thin, the offset is negligible. In some embodiments, for which the offset is not negligible and for which the emitters and receivers are evenly spaced on PCB 411, beam offsets are handled in software, inter alia by calculating the position of the corresponding blocked beam according to the beam position when it crosses the screen, which is offset from the emitter and receiver location. In other embodiments, for which the offset is not negligible, the emitters and receivers are not evenly spaced on PCB 411, in order for the offset to cause the beams crossing detection zone 501 to be evenly spaced. The dotted portions 610 of the beams represent the beams passing through light guides 340 and 341, which are not shown in this figure.

Figure 27:
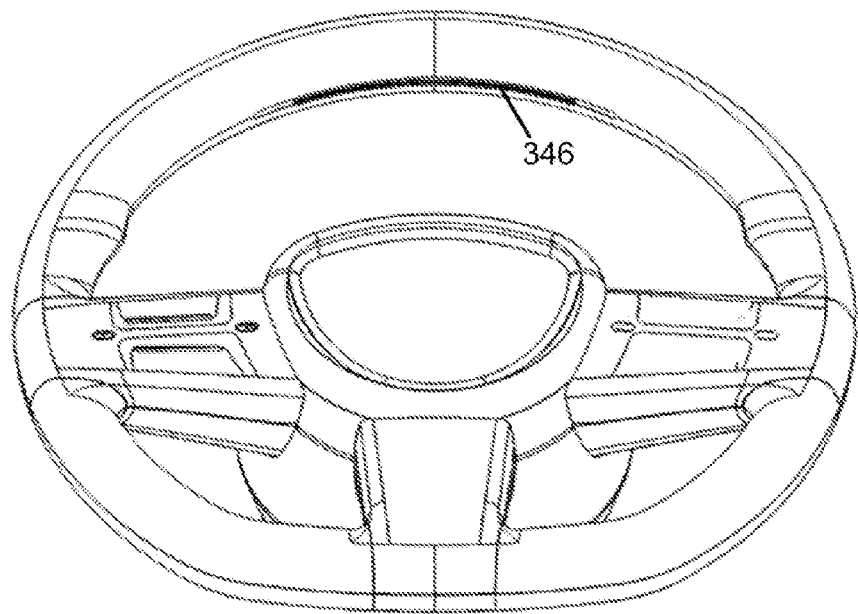
Figure 28:
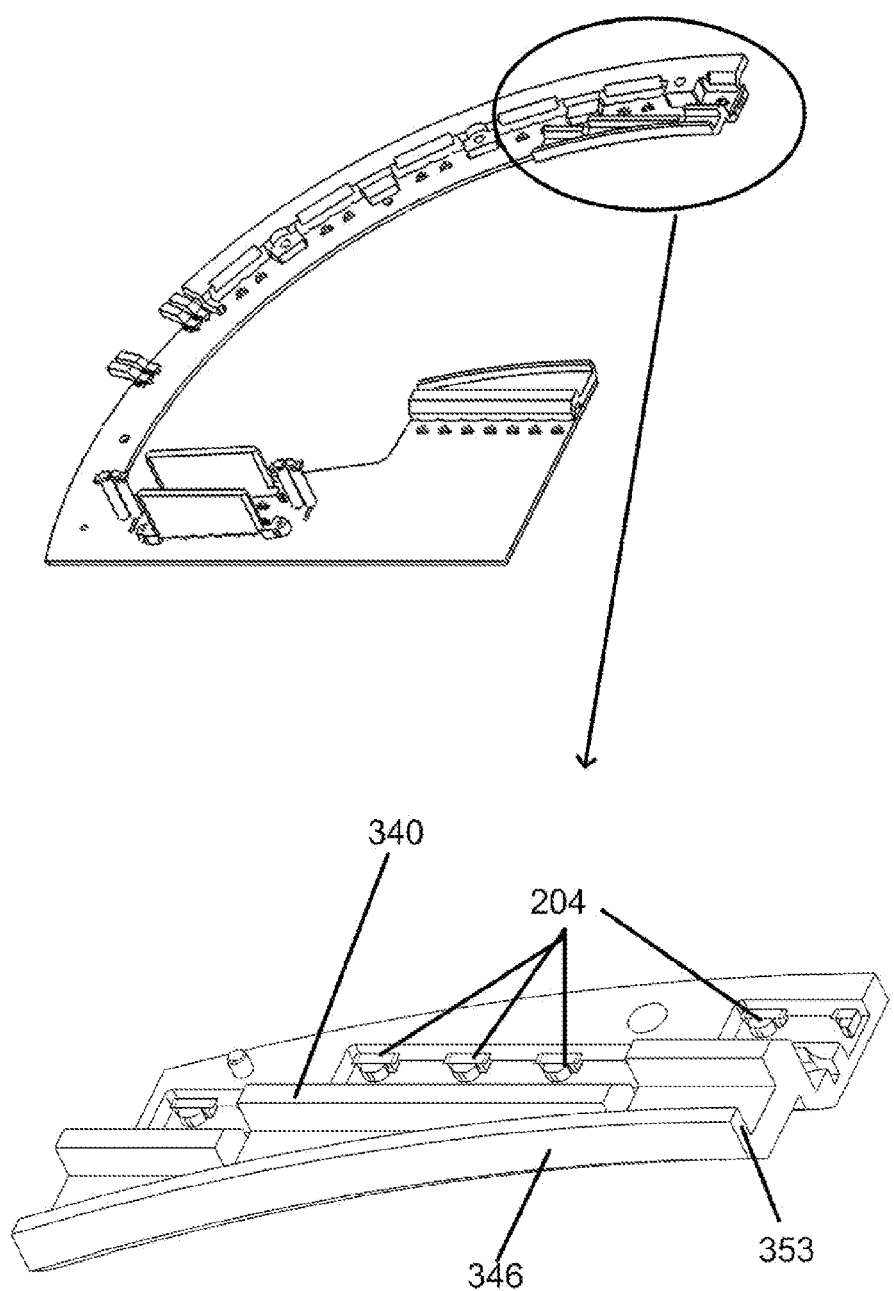
Figure 29:
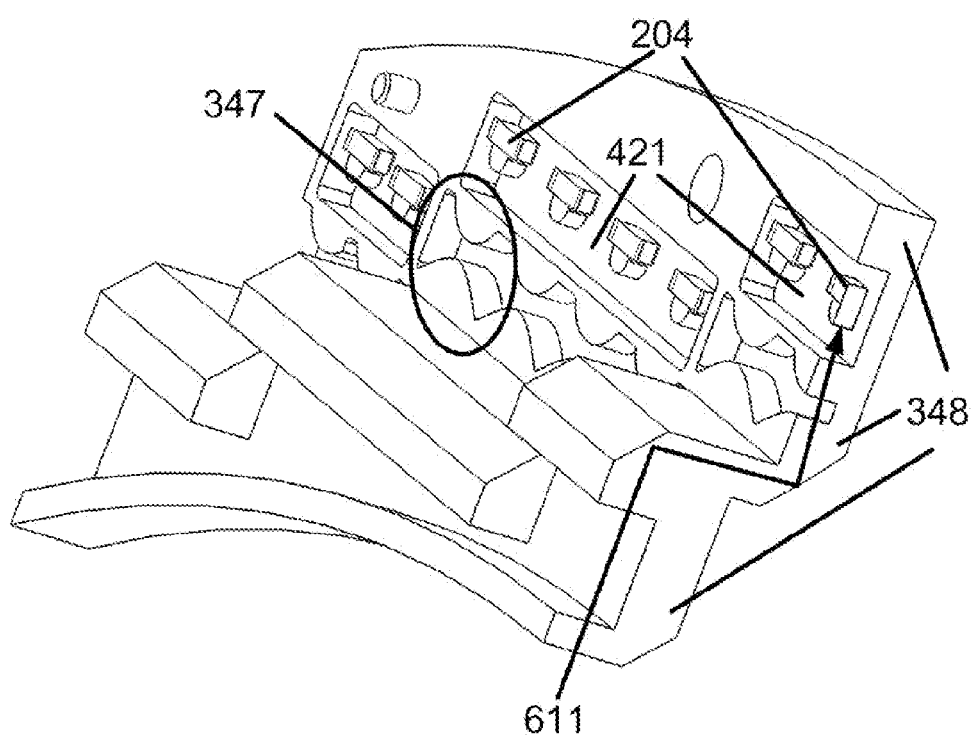

The second half of the light sensor for zone 501 is now discussed. FIG. 27 shows the exposed lower edge 346 of a light guide that receives the projected light beams and directs the beams onto receivers embedded inside the circular gripping member of the steering wheel. FIGS. 28 and 29 are two cross-sectional views showing three staggered rows of receiver elements 204 together with their respective light guides inside the circular gripping member of steering wheel 400. Collimated light crossing detection zone 501 enters the gripping member through curved window 353. In order to maintain the collimation of the light beams, window 353 has a uniform width and substantially similar arcs at both its inner and outer surfaces, like window 345 described hereinabove.

FIG. 29 shows light guide 340 from a different angle than in FIG. 28. The collimating portion of this light guide is circled section 347. This collimating portion uses two air-to-plastic interfaces to direct the collimated wide beam onto a respective receiver 204. The operation of these collimating lenses is more fully explained in U.S. patent application Ser. No. 13/424,543 for OPTICAL ELEMENTS WITH ALTERNATING REFLECTIVE LENS FACETS, the contents of which are incorporated herein by reference. In particular, reference is made to FIGS. 50-52 and associated paragraphs [00267]-[00271] in U.S. patent application Ser. No. 13/424, 543. In the embodiment illustrated in FIG. 29 the light guides are formed of a single piece of plastic 348. The receivers 204 are shown suspended in cavities 421 formed in plastic 348. The PCB on which these receivers are mounted is not shown in the figure: it is above the receivers, and covers cavities 421. The path of a light beam 611 through light guide 340 is shown.

Figure 30:
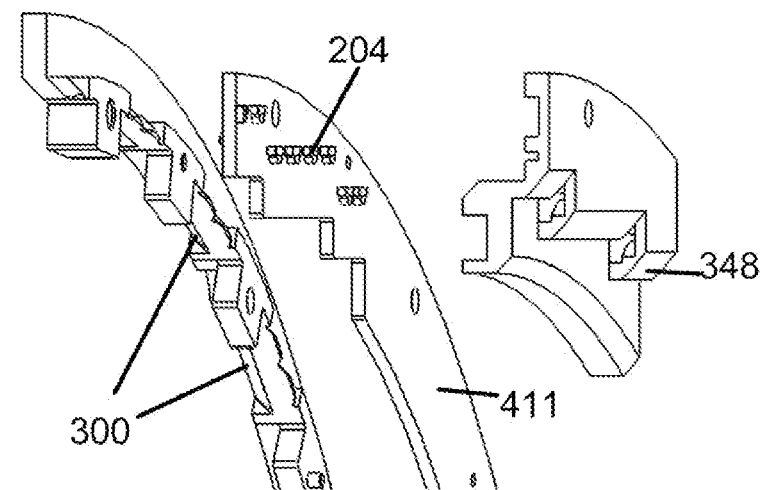
Figure 30:
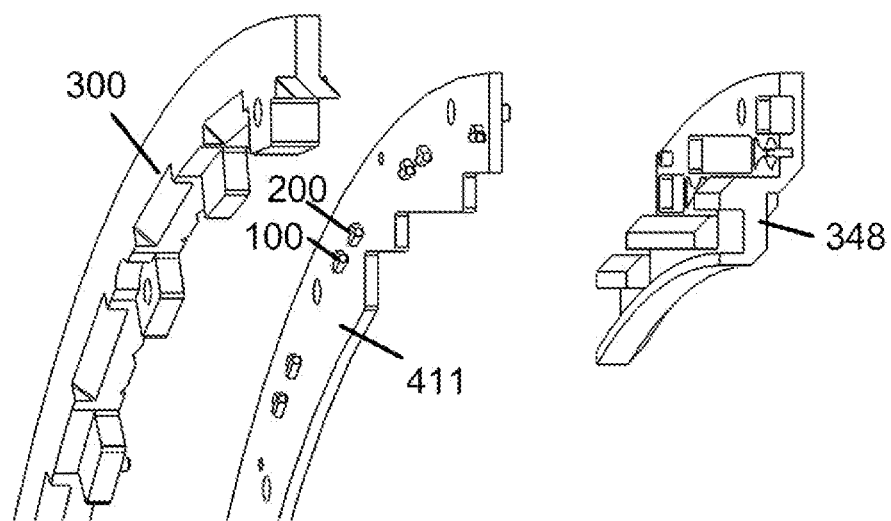

Light transmitters and receivers for two different sensors are mounted on two sides of PCB 411. FIG. 30 shows exploded views from both sides of steering wheel PCB 411. The light receivers 204 for detection zone 501 are on one side of the PCB, and transmitter-receiver pairs 100-200 for detection zone 502 are mounted on the reverse side of this PCB. The exploded view also shows light guide 300, used for detection zone 502, and plastic element 348 that forms light guide 340, both mounted on PCB 411.

The type A sensor used for detection zones 503 and 504 described hereinabove will now be described in detail.

Figure 31:
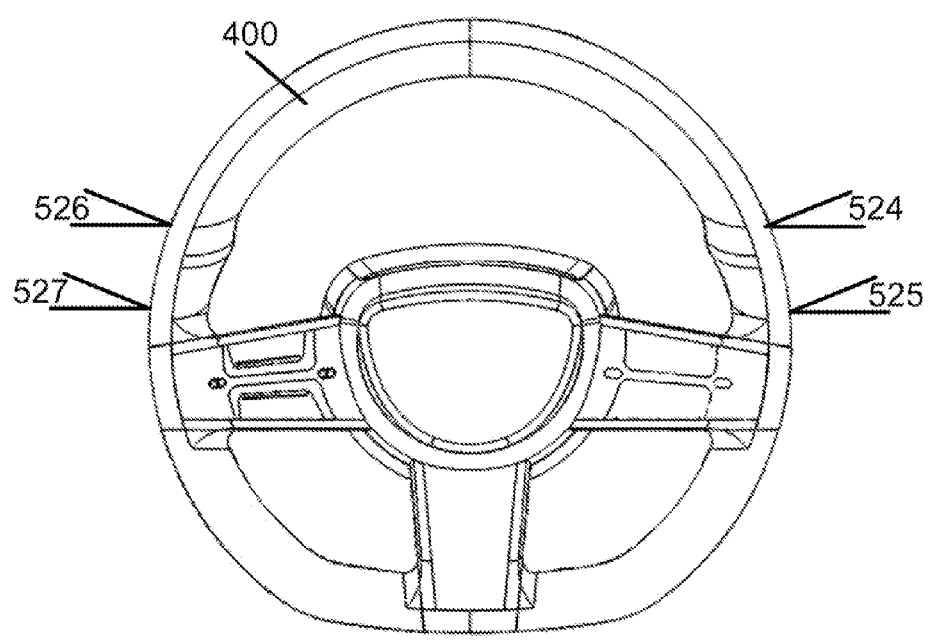
FIGS. 31-35 are simplified diagrams of proximity sensors embedded in the outer rim of a steering wheel, in accordance with an embodiment of the present invention.
Figure 32:
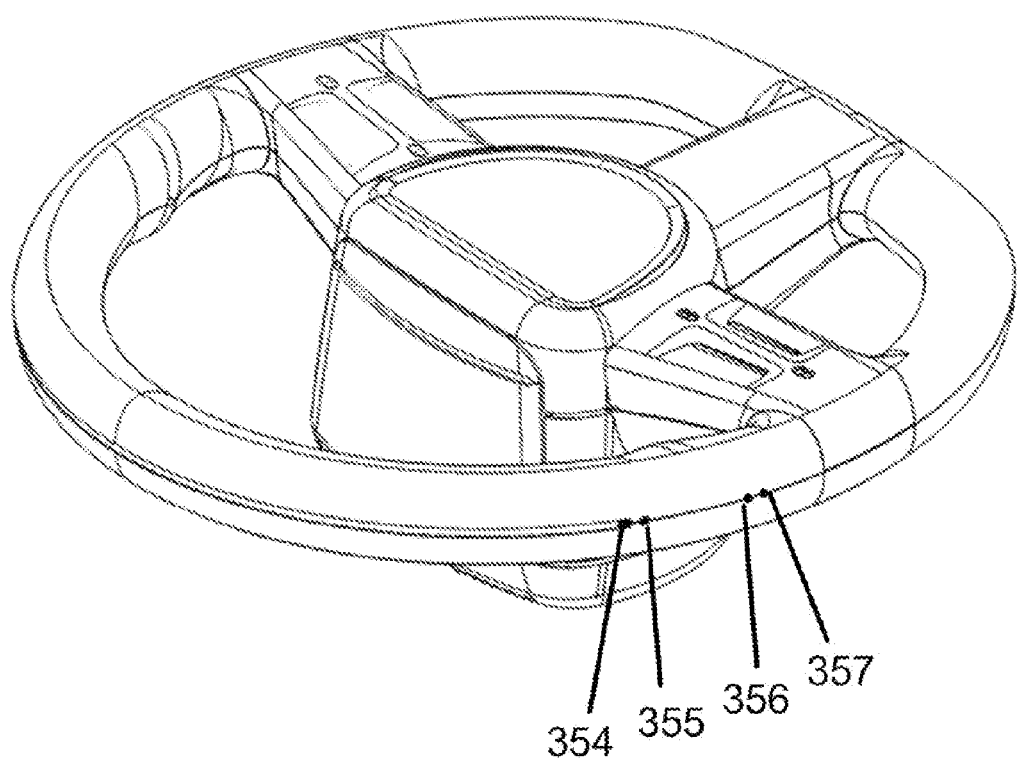
Figure 33:
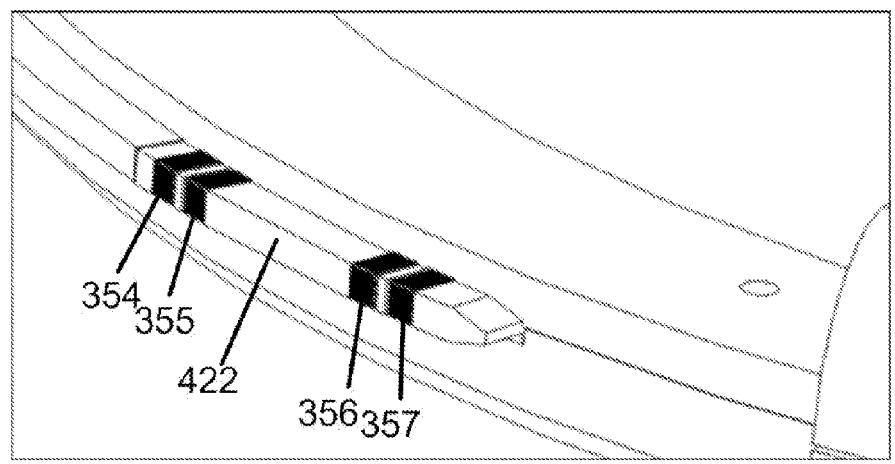
Figure 34:
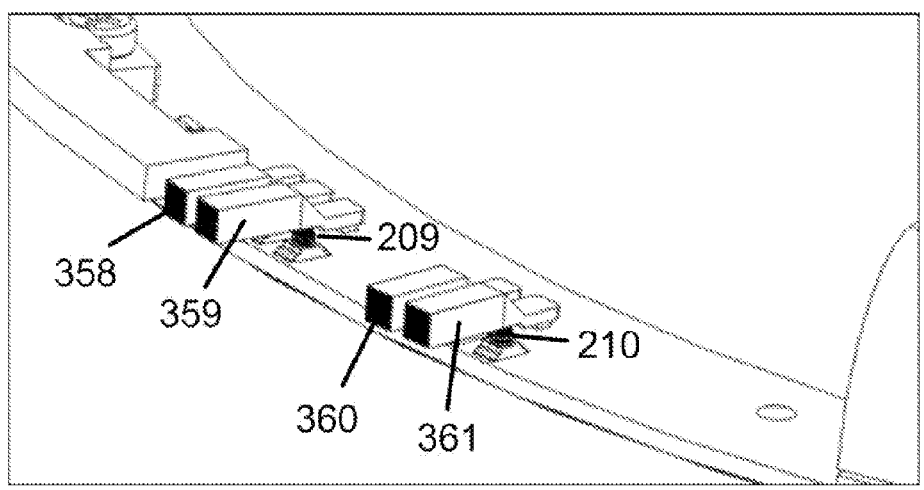
Figure 35:
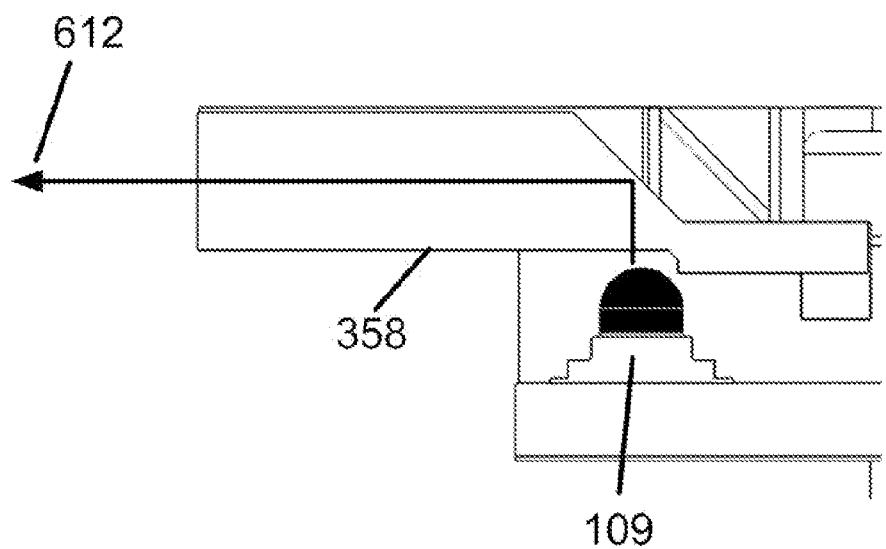

Reference is made to FIGS. 31-35, which are simplified diagrams of proximity sensors embedded in the outer rim of a steering wheel, in accordance with an embodiment of the present invention. FIG. 31 shows four detection zones 524-527 on either side of steering wheel 400. FIG. 32 shows two of the sensors that provide these detection zones on one side of the steering wheel by projecting light beams away from the wheel and detecting a portion of the beams that is reflected back by a hovering finger or hand. As seen by the driver, each sensor includes a light emitting surface 354 or 356, and a neighboring light receiving surface 355 or 357. FIG. 33 shows a plastic rim 422 inlaid in the outer rim of the steering wheel and having near-infrared (NIR) transmissive portions 354-357 that allow the passage of NIR light for these sensors. FIG. 34 shows that the NIR transmissive portions are actually separate light guides 358-361, where a pair of light guides forms a detection channel. Each of light guides 358-361 is coupled to a respective transmitter or receiver component. Thus, light guides 358 and 360 are coupled to respective transmitters (blocked from view in the figure by light guides 359 and 361), and light guides 359 and 361 are coupled to receivers 209 and 210, respectively. FIG. 35 shows a light beam path 612 through light guide 358. FIG. 35 also shows transmitter 109 coupled to light guide 358.

Figure 36:
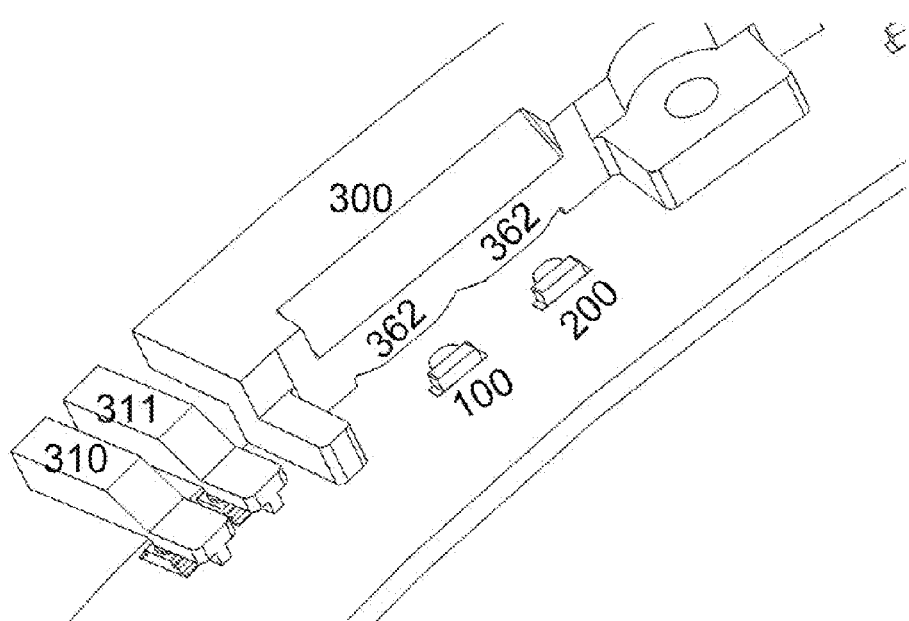
FIGS. 36-38 are simplified diagrams of touch sensors embedded across the outer rim of a steering wheel, in accordance with an embodiment of the present invention.
Figure 37:
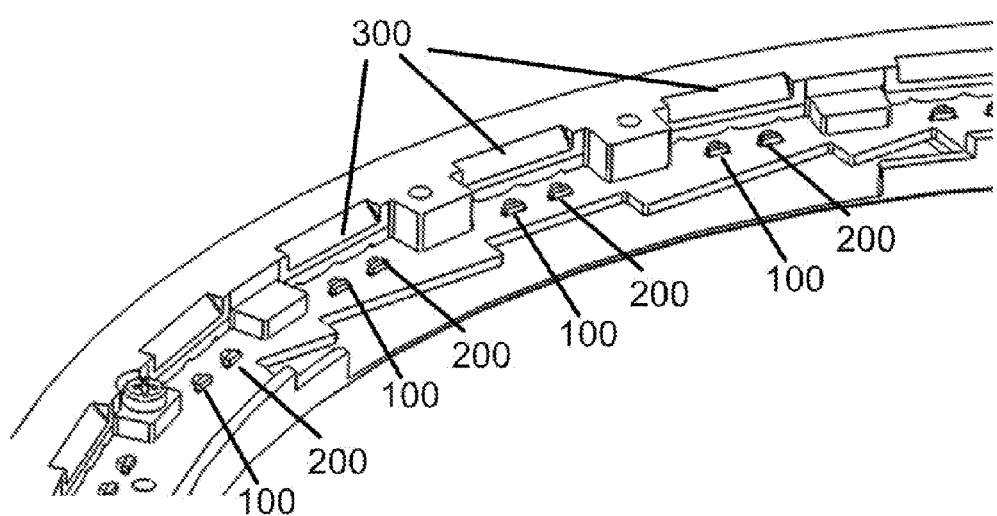
Figure 38:
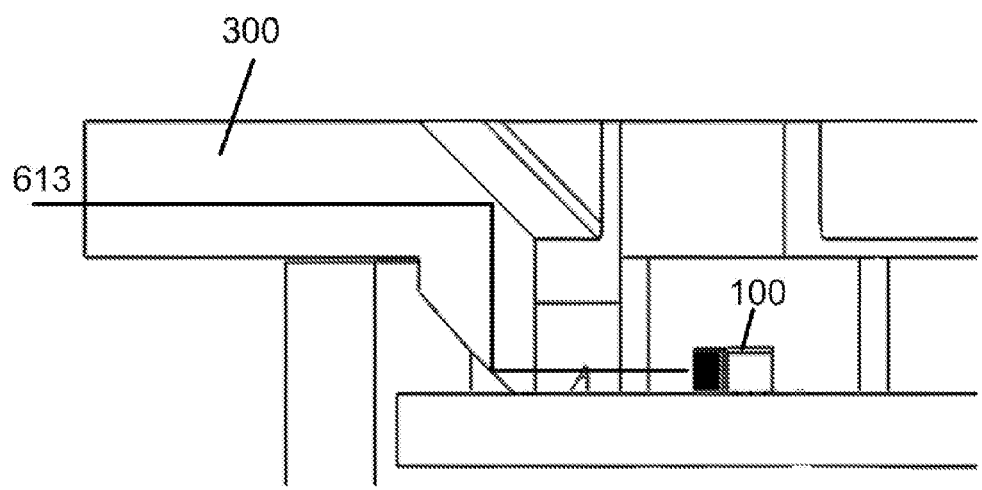

Reference is made to FIGS. 36-38, which are simplified diagrams of touch sensors embedded across the outer rim of a steering wheel, in accordance with an embodiment of the present invention. FIGS. 36 and 37 show the components in a type A sensor used for detection zone 502 described hereinabove; namely, transmitter-receiver pairs 100-200 and light guide 300. Light guide 300 is shared by both transmitter 100 and receiver 200, and light guide 300 has a collimating lens portion 362 opposite each transmitter and opposite each receiver. FIG. 38 shows how light guide 300 acts as a periscope for the light beams, such as light beam 613 emitted by emitter 100. As described above, a steering wheel equipped with a series of these sensors along its outer rim is enabled to detect tap gestures and hand-slide gestures along the wheel's outer rim.

In some embodiments of the present invention, a processor connected to the touch sensors along the steering wheel rim or spokes detects the number of fingers on each hand touching the wheel. This is performed by heuristically determining the size of the segment covered by a hand holding the wheel, or by detecting a series of up to four objects next to each other along the sensor array. When the driver taps the wheel with only one finger as he grips the wheel, e.g., by tapping on the wheel with one finger while continuing to grip the wheel with the other fingers, the processor determines which finger performed the tap according to the location of the tap within the segment of the wheel being held. This enables a user interface whereby different fingers are associated with different functions. For example, taps by an index finger control the stereo and taps by the middle finger control the telephone. Determination of which finger is tapping the wheel is based on the finger's relative position within the segment of the wheel that is held, as detected by the touch sensors. As such, this user interface is not dependent on which segment of the wheel is being touched. It is thus applied anywhere on the wheel, based on relative finger position. In some cases, the processor distinguishes between right and left hands according to right and left halves of the wheel.

In some embodiments of the present invention, multiple sensors are arranged around the tubular or cylindrical surface of the wheel grip in order to detect when the driver rotates his hand around the grip in the manner of a motorcycle driver revving a motorcycle engine by rotating the handle bar grip. The user interface is configured to control a particular feature by this gesture. In applications of the present invention to motorcycle handlebars, these sensors provide an alternative to rotating handlebar grips for controlling the speed of the motorcycle engine.

In some embodiments of the present invention, proximity detectors or touch detectors are also mounted on the rear of the steering wheel grip or spokes to detect tap gestures on the back of a spoke or on the back of the wheel grip performed by fingers wrapped around the wheel. For example, these gestures are used to shift gears, or to shift the drive mode. Drive modes include, inter alia, eco mode, sport mode, 2-wheel drive and 4-wheel drive.

In some embodiments of the present invention, the vehicle loads a user profile that configures the user interface, including assigning various gestures to respective control settings. The vehicle supports multiple users by allowing each user to download his settings to the vehicle. Thus, settings for multiple users are uploaded to an Internet server. When a driver enters a car, the driver downloads his settings from the Internet server to the vehicle, thus adapting the vehicle to his customized settings. For example, different gestures can be mapped to control different features by the driver. One application for this system is a rental car. When a driver rents a car he downloads his user profile to the rental car so that the user interface is familiar. Another application is for car dealerships, whereby a car's user interface is customized for a buyer while the buyer tries out a test model or sits inside a dummy cockpit. The dealer configures the user's profile in the demo car and uploads it to the Internet server. The dealer does not need to customize the purchased car when it arrives beyond downloading the buyer's profile.

Aspects of the present invention also relate to contextual user interfaces. When a driver enters the car, the car's user interface asks the driver what he wants to do and guides him to do so, using a display screen. Thus the UI presents options based on context. If the engine is off, the UI asks if the driver wants to start the car. If the driver turns off the motor, the UI presents the following initial options: open doors, open gas tank, open trunk, and open hood. In some embodiments, the display renders a map of the different hand slide and tap gestures that the driver can perform on the steering element to execute these options. If the driver stops the car, the UI asks if the driver wants to park. If the driver responds that he does wish to park, the UI presents parking options, e.g., park on the street or in a nearby lot. In an automated car, capable of traveling without a driver, the UI offers the further option to refill gas, battery or solar panel (depending on how the car is powered) while the driver is out shopping or working. Before leaving the car, the UI asks the driver when to return to the parking spot.

In some embodiments, a biometric sensor is also added to the steering element of the present invention. In order to access the UI, the biometric sensor must first register the driver. If the biometric sensor detects that the driver is not fit to drive the car, e.g., the sensor detects a high heart rate or high alcohol content, the UI responds accordingly and does not allow the driver to drive.

Another embodiment of a steering wheel according to the present invention is illustrated in FIGS. 39-42. In this embodiment, the steering wheel includes two embedded touch-sensitive display screens. The display screen information is displayed on a head-up display to the driver so that the driver need not remove his eyes from the road to look down at the displays.

Figure 39:
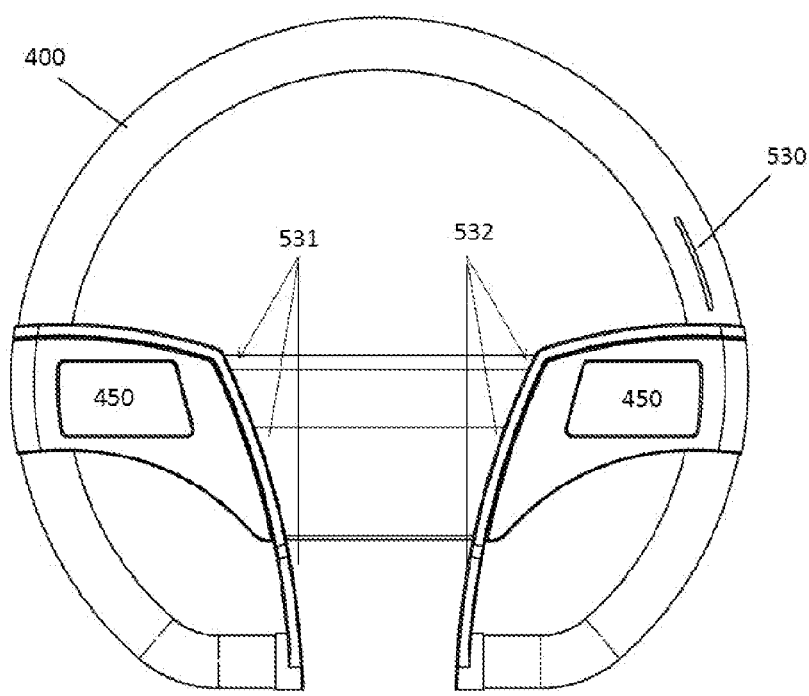
FIG. 39 is a simplified illustration of a steering wheel with multiple touch sensors and embedded touch screen displays, in accordance with an embodiment of the present invention.

Reference is made to FIG. 39, which is a simplified illustration of a steering wheel with multiple touch sensors and embedded touch screen displays, in accordance with an embodiment of the present invention FIG. 39 shows steering wheel 400 having two embedded touch screens 450 and a slider control 530. Slider control 530 is implemented as a series of light emitters and receivers similar to slider controls 522 and 523 described hereinabove with reference to FIGS. 17-20. Touch screens 450 are touch-enabled by a series of emitters and receivers along the screen edges that form a touch-detection light grid that covers each screen 450. Steering wheel 400 is also shown having two proximity sensor strips 531 and 532 for detecting a driver's hand placed on the steering column between these two strips.

Figure 40:
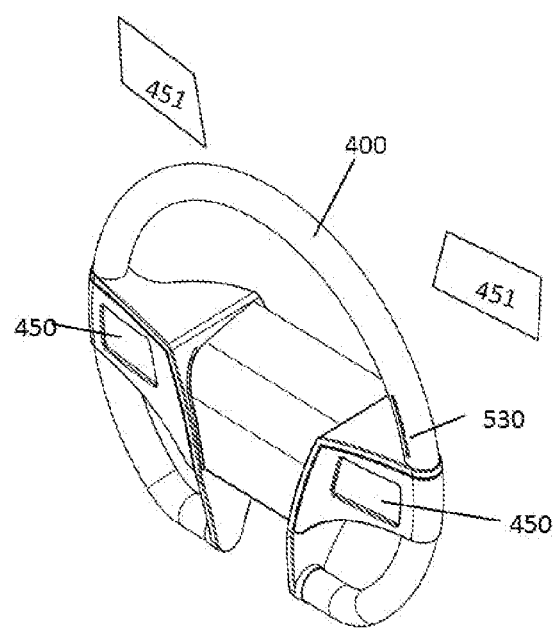
FIG. 40 is a simplified illustration of the steering wheel of FIG. 39 with a head-up display, in accordance with an embodiment of the present invention.

Reference is made to FIG. 40, which is a simplified illustration of the steering wheel of FIG. 39 with a head-up display, in accordance with an embodiment of the present invention. FIG. 40 shows steering wheel 400 viewed at an angle. Two head-up displays 451 are provided for rendering graphics from screens 450 at a location easily viewable by the driver. The driver can interact with a user interface on screens 450 by viewing head-up displays 451 and performing touch gestures on screens 450.

Figure 41:
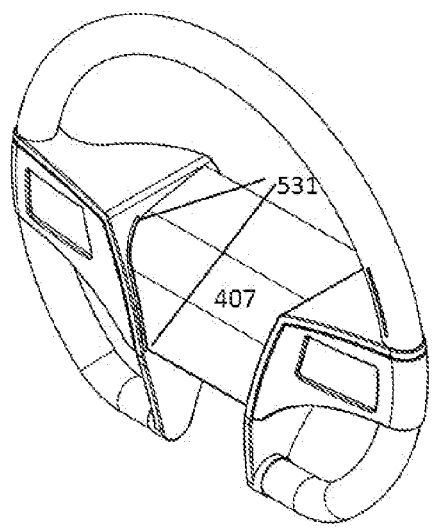
FIGS. 41 and 42 are simplified illustrations or proximity sensors that line the steering column of the steering wheel of FIG. 39, in accordance with an embodiment of the present invention.
Figure 42:
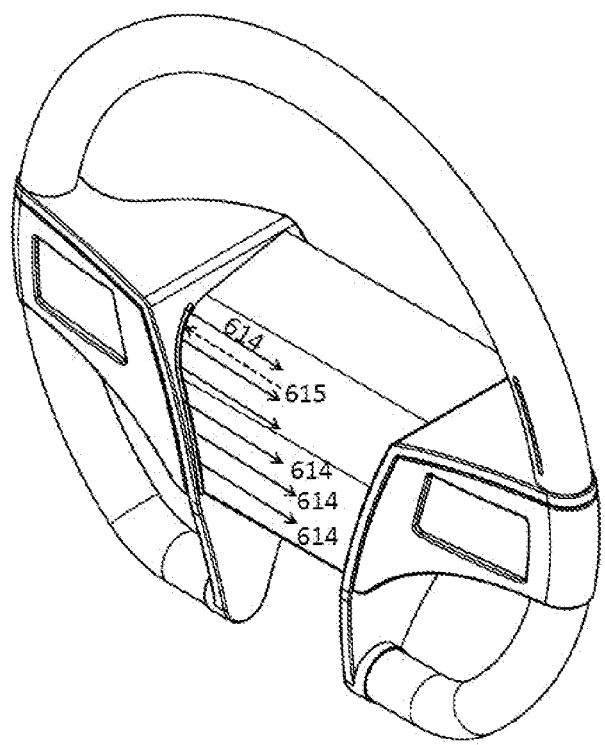

Reference is made to FIGS. 41 and 42, which are simplified illustrations or proximity sensors that line the steering column of the steering wheel of FIG. 39, in accordance with an embodiment of the present invention. FIG. 41 shows that the front and top of steering column 407 is touch sensitive by virtue of two strips of proximity sensors. A first proximity sensor strip 531 is shown. This strip is formed by an alternating series of emitters and detectors that emit light beams across the outer surface of column 407. This strip curves along the contours of steering column 407. When the driver places his hand on steering column 407, the hand reflects the projected light beams back into the proximity sensor where neighboring detectors sense an increase in reflected light. The operation of this type of proximity sensor is described in applicant's co-pending U.S. patent application Ser. No. 13/775,269 entitled REMOVABLE PROTECTIVE COVER WITH EMBEDDED PROXIMITY SENSORS, especially FIGS. 4-10 there. The second proximity sensor strip 532 is opposite strip 531 and is not visible given the viewing angle of FIG. 41.

FIG. 42 shows the light beams of proximity sensor strip 531. Emitter beams 614 are shown adhering to the contours of steering column 407. One reflected beam is shown as dashed beam 615. When the driver places a hand on steering column 407 his hand reflects one or more of beams 614 back as beam 615.

Figure 43:
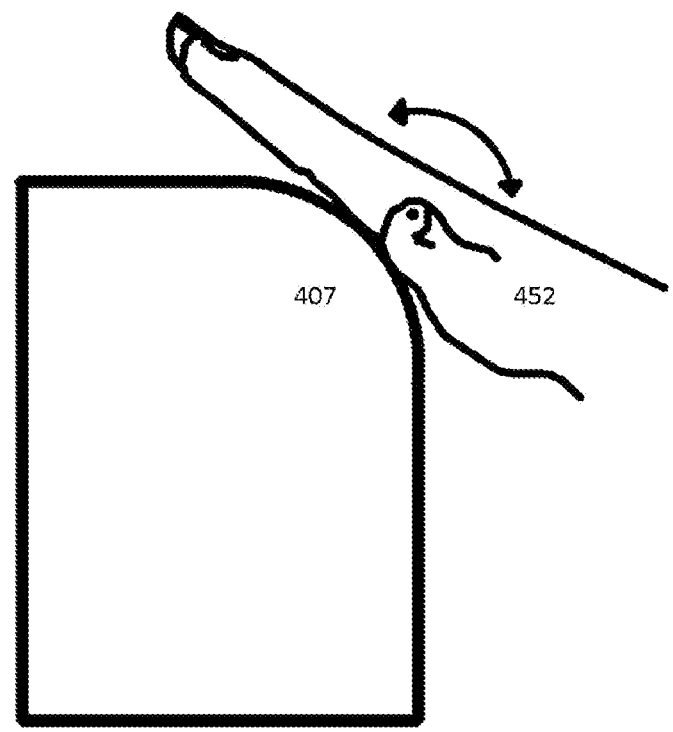
FIG. 43 is a simplified illustration of a user interface gesture performed on the steering column of the steering wheel of FIG. 39, in accordance with an embodiment of the present invention.

Reference is made to FIG. 43, which is a simplified illustration of a user interface gesture performed on the steering column of the steering wheel of FIG. 39, in accordance with an embodiment of the present invention. FIG. 43 shows a hand gesture detected by the two proximity sensors lining steering column 407. In this gesture the driver tilts palm 452 along the rounded corner formed by steering column 407. In some applications, this gesture is used to adjust the angle of a side view mirror. Thus, titling the palm downward and touching a higher portion of column 407 tilts the mirror upwards; tilting the palm to be more vertical tilts the mirror downward.

The two proximity sensors lining two opposite edges of steering column 407 form a unique two-dimensional detector. A location along the proximity sensor at which the reflected beam is detected is a location along one dimension. The nearer the reflecting object is to strip 531 or 532, the greater the detection signal. Comparing the detection signals of proximity strip 531 to those of proximity strip 532 provides a coarse estimation of where the finger is located between the two strips. Thus, if both strips detect similar amounts of reflected light, the finger is roughly in the middle between the two strips. Whereas if one proximity sensor strip detects more light than the other, the finger is nearer to the high detection strip.

Embodiments of the present invention also relate to vehicle dashboards, driver display systems and related user interfaces.

Figure 44:
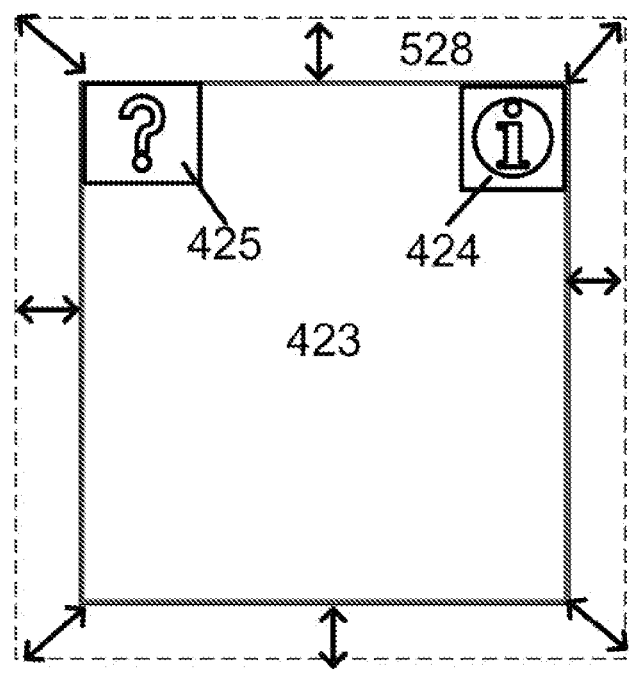
FIGS. 44-46 are simplified illustrations of user interfaces and associated sweep gestures that are enabled on a vehicle dashboard, in accordance with an embodiment of the present invention.
Figure 45:
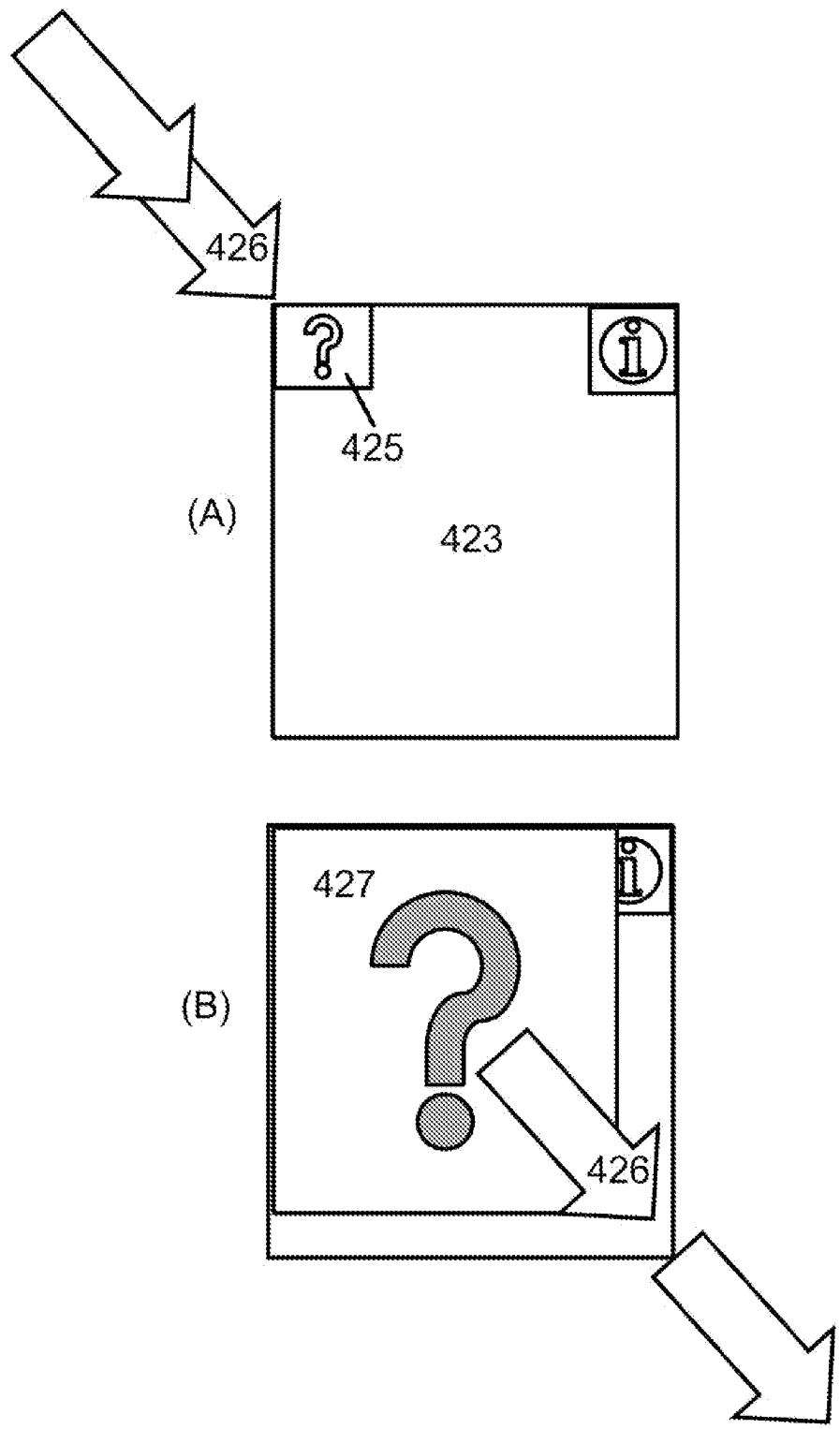
Figure 46:
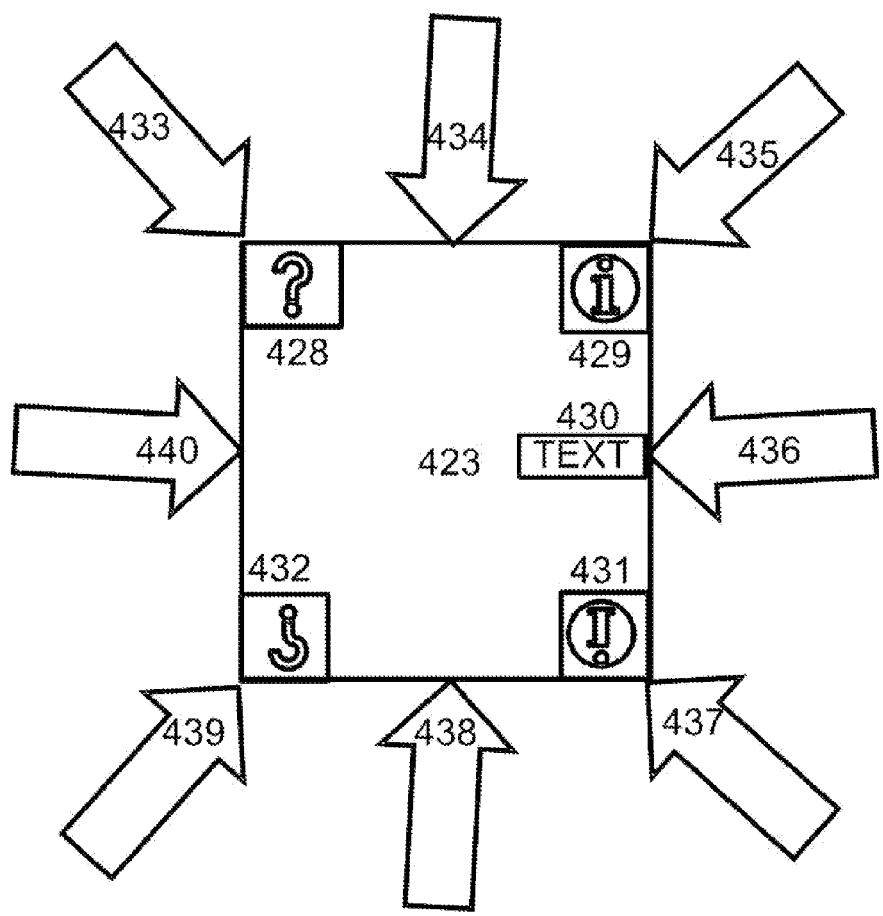

Reference is made to FIGS. 44-46, which are simplified illustrations of user interfaces and associated sweep gestures that are enabled on a vehicle dashboard, in accordance with an embodiment of the present invention. FIG. 44 shows dashboard display 423 having proximity sensors along its edges. In some embodiments of the present invention, the display itself does not provide touch detection, i.e., it is not a touch screen. A frame 528 is shown surrounding the display. This frame indicates a detection zone for detecting proximity and hover gestures. The display shows two icons 424 and 425 in the upper right and left corners, each representing a family of related functions. When the driver performs a sweeping gesture with his hand above a portion of the display, he expands a corresponding icon to reveal a complete set of related functions.

FIG. 45 shows the effect of a gesture in this context. Dashboard display 423 is shown in the upper portion of FIG. 45 marked (A). A sweeping gesture across the upper left corner of the display and continuing diagonally across the display is indicated by arrows 426. As the gesture progresses across the screen diagonal, icon 425 expands across the screen. The expanded icon is shown as icon 427 in the lower portion of FIG. 45 marked (B). In some embodiments, this expanded area is populated with icons related to the function represented by icon 425. In other embodiments, the expanded icon presents further options for similar gestures that expand, providing multiple layers of expanded screens.

Embodiments of the present invention thus provide easy access to an extensive array of functions with a simple hand gesture in an associated corner or side of the display. This allows the user interface to present a limited number of icons on the initial display without cluttering up the display, and to expand a selected icon to reveal a full list of related functions in response to the aforementioned sweeping gesture.

FIG. 46 shows dashboard display 423 with four icons 428, 429, 431 and 432 in the four corners of the display and a text box 430 at the right edge of the display. Eight arrows 433-440 indicating eight different sweep gestures are shown. Each sweep gesture changes the display in accordance with an icon or text associated with that gesture. In FIG. 46, gestures 433, 435, 437 and 439 are each associated with a respective icon, and gesture 436 is associated with text 430. Additional gestures such as gliding along the edges of the display also provide functionality in some embodiments.

The hover and proximity sensors that detect the dashboard sweep gestures described hereinabove are substantially the same sensors described with respect to the steering wheel. These sensors are distributed at discrete locations around the dashboard display.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A system for use in a vehicle, comprising:
a steering element situated opposite a driver seat in a vehicle, the steering element comprising a plurality of proximity sensors encased in the periphery of the steering element operable to detect hand gestures along the outer periphery of the steering element;
an interactive deck housed in the vehicle, for providing at least one of radio broadcast, video broadcast, audio entertainment, video entertainment and navigational assistance in the vehicle; and
a processor housed in the vehicle, coupled with said proximity sensors and said deck, operable (i) to identify an upward hand gesture detected by said proximity sensors, and to increase an adjustable setting for said deck in response to thus-identified upward hand gesture, and (ii) to identify a downward hand gesture detected by said proximity sensors, and to decrease the adjustable setting in response to the thus-identified downward hand gesture.

2. The system of claim 1 wherein said deck operates in accordance with a plurality of features having adjustable settings, wherein said processor is operative to adjust a setting of a currently selected one of said features in response to identifying hand slide gestures, and wherein said processor is operative to change the currently selected feature in response to identifying at least one tap gesture on the outer periphery of said steering element.

3. The system of claim 2 wherein said deck comprises a display, and wherein, when said processor changes the selected feature, said processor also renders a graphic indicating the newly selected feature on said display.

4. The system of claim 1 wherein the adjustable settings are members of the group consisting of volume, radio channel, track in a music library, web page, map and picture.

5. The system of claim 1 further comprising a second plurality of proximity sensors encased in said steering element and facing the driver seat, for detecting hand wave gestures between said steering element and a driver, and wherein said processor is operable to identify the hand wave gestures detected by said second proximity sensors, and to change a mode of said deck in response to the thus-identified hand wave gestures.

6. The system of claim 5 wherein the vehicle comprises an airbag having an adjustable inflation setting, wherein said processor determines a distance between the driver and the steering element based on outputs from said second proximity sensors, and wherein said processor adjusts the inflation setting for the airbag based on the thus-determined distance.

7. The system of claim 1, wherein said processor identifies a series of objects detected by said proximity sensors as concurrently touching said steering element, as being respective fingers on one hand, wherein, when said proximity sensors detect that one of the objects is lifted from said steering element, said processor determines which of the fingers was lifted based on a relative location of the lifted object within the series of objects, and wherein said processor performs different functions in response to identifying gestures performed by different thus-determined ones of the fingers.

8. The system of claim 1 wherein said steering element further comprises:
a cavity;
an array of invisible-light emitters connected to said processor operable to project invisible light beams across said cavity; and
an array of light detectors connected to said processor operable to detect the invisible light beams projected by said invisible-light emitters, and to detect gestures inside said cavity that interrupt the invisible light beams projected by said invisible-light emitters,
and wherein said processor is operable to identify the gestures inside said cavity detected by said light detectors, and to control said deck in response to the thus-identified gestures inside said cavity.

9. The system of claim 8, further comprising:
multiple arrays of invisible-light emitters connected to said processor and operable to project invisible light beams across different geometric planes inside said cavity; and
multiple arrays of light detectors connected to said processor and operable to detect the invisible light beams projected by said invisible-light emitters, and to detect wave gestures across multiple geometric planes inside said cavity that interrupt the invisible light beams projected by said invisible-light emitters, and wherein said processor is operable to identify the wave gestures inside said cavity detected by said arrays of light detectors, and to control said deck in response to the thus-identified wave gestures.

10. The system of claim 8 further comprising visible-light emitters housed in said steering element and connected to said processor, and wherein said processor is operable to activate at least one of said visible-light emitters in response said light detectors detecting that the invisible light beams projected by said invisible-light emitters are being interrupted.

11. The system of claim 8, wherein said deck comprises a display, and wherein said processor is operable to enlarge an image on said display in response to identifying a multi-finger spread gesture inside said cavity.

12. The system of claim 11, wherein said processor is operable to pan the image on said display in response to identifying a one-finger translation gesture inside said cavity.

13. The system of claim 1 wherein said processor controls said deck in response to the identified hand gestures, only when said steering element is not substantially rotated.

14. The system of claim 1 further comprising a wireless phone interface for receiving incoming phone calls, and wherein said processor is operable to reject an incoming phone call in response to identifying a single tap gesture on the outer perimeter of said steering element, and to accept an incoming call in response to identifying a double tap gesture on the outer perimeter of said steering element.

15. The system of claim 1 wherein said processor is operable to mute said deck in response to identifying a sudden quick hand slide gesture along the outer periphery of said steering element.

16. The system of claim 1, wherein the periphery of said steering element is separated into virtual input zones, wherein said processor is operable to perform a different control command on said deck in response to identifying hand gestures in different input zones, and to render an image of said steering element on a display mounted in the vehicle, the image indicating which control command is associated with each input zone, in response to identifying at least one tap gesture on the outer periphery of said steering element.

17. The system of claim 1, wherein said processor is further operable to open a gas tank in the vehicle, open a trunk in the vehicle, lock doors of the vehicle, and close windows in the vehicle, in response to identifying respective hand gestures.

18. The system of claim 1, wherein said steering element comprises at least one interactive display embedded therein, wherein the vehicle comprises a vehicle display comprising either a head-down display or a head-up display, and wherein information displayed on said at least one interactive display is replicated on the vehicle display.

19. The system of claim 1 wherein said interactive deck comprises:
a display; and
a frame surrounding said display comprising a second plurality of proximity sensors operable to detect hand gestures above the frame,
wherein said processor is operable to present a graphic representing a group of related functions in a corner of said display, and to identify a diagonal hand wave gesture above said frame and beginning above the corner of said display detected by said second plurality of proximity sensors, and to translate the graphic across said display and thereby reveal icons for the related functions in response to the thus-identified diagonal hand wave gesture.

20. The system of claim 19, wherein said processor is operable to present multiple graphics in respective corners of said display.

21. A system for use in a vehicle, comprising:
a steering element situated opposite a driver seat in a vehicle, the steering element comprising:
a first plurality of proximity sensors encased in the periphery of the steering element operable to detect hand gestures along the outer periphery of the steering element; and
a second plurality of proximity sensors encased in the steering element and facing the driver seat, for detecting hand wave gestures between the steering element and a driver;
an interactive deck housed in the vehicle, for providing at least one of radio broadcast, video broadcast, audio entertainment, video entertainment and navigational assistance in the vehicle;
an airbag having an adjustable inflation setting; and
a processor housed in the vehicle, coupled with said proximity sensors and said deck, operable to (i) identify the hand gestures detected by said proximity sensors, and to control said deck in response to thus-identified hand gestures, (ii) to identify the hand wave gestures detected by said second proximity sensors, and to change a mode of said deck in response to the thus-identified hand wave gestures, and (iii) to determine a distance between the driver and the steering element based on outputs from said second proximity sensors, and to adjust the inflation setting for the airbag based on the thus-determined distance.

22. The system of claim 21 wherein said deck operates in accordance with a plurality of features having adjustable settings, wherein said processor is operative to adjust a setting of a currently selected one of said features in response to identifying hand slide gestures, and wherein said processor is operative to change the currently selected feature in response to identifying at least one tap gesture on the outer periphery of said steering element.

23. The system of claim 22 wherein said deck comprises a display, and wherein, when said processor changes the selected feature, said processor also renders a graphic indicating the newly selected feature on said display.

24. The system of claim 22 wherein the adjustable settings are members of the group consisting of volume, radio channel, track in a music library, web page, map and picture.

25. The system of claim 21 wherein said processor identifies a series of objects detected by said proximity sensors as concurrently touching said steering element, as being respective fingers on one hand, wherein, when said proximity sensors detect that one of the objects is lifted from said steering element, said processor determines which of the fingers was lifted based on a relative location of the lifted object within the series of objects, and wherein said processor performs different functions in response to identifying gestures performed by different thus-determined ones of the fingers.

26. The system of claim 21 wherein said steering element further comprises:
a cavity;
an array of invisible-light emitters connected to said processor operable to project invisible light beams across said cavity; and
an array of light detectors connected to said processor operable to detect the invisible light beams projected by said invisible-light emitters, and to detect gestures inside said cavity that interrupt the invisible light beams projected by said invisible-light emitters, and wherein said processor is operable to identify the gestures inside said cavity detected by said light detectors, and to control said deck in response to the thus-identified gestures inside said cavity.

27. The system of claim 26 further comprising:
multiple arrays of invisible-light emitters connected to said processor and operable to project invisible light beams across different geometric planes inside said cavity; and
multiple arrays of light detectors connected to said processor and operable to detect the invisible light beams projected by said invisible-light emitters, and to detect wave gestures across multiple geometric planes inside said cavity that interrupt the invisible light beams projected by said invisible-light emitters,
and wherein said processor is operable to identify the wave gestures inside said cavity detected by said arrays of light detectors, and to control said deck in response to the thus-identified wave gestures.

28. The system of claim 26 further comprising visible-light emitters housed in said steering element and connected to said processor, and wherein said processor is operable to activate at least one of said visible-light emitters in response said light detectors detecting that the invisible light beams projected by said invisible-light emitters are being interrupted.

29. The system of claim 26 wherein said deck comprises a display, and wherein said processor is operable to enlarge an image on said display in response to identifying a multi-finger spread gesture inside said cavity.

30. The system of claim 29 wherein said processor is operable to pan the image on said display in response to identifying a one-finger translation gesture inside said cavity.

31. The system of claim 21 wherein said processor controls said deck in response to the identified hand gestures, only when said steering element is not substantially rotated.

32. The system of claim 21 further comprising a wireless phone interface for receiving incoming phone calls, and wherein said processor is operable to reject an incoming phone call in response to identifying a single tap gesture on the outer perimeter of said steering element, and to accept an incoming call in response to identifying a double tap gesture on the outer perimeter of said steering element.

33. The system of claim 21 wherein said processor is operable to mute said deck in response to identifying a sudden quick hand slide gesture along the outer periphery of said steering element.

34. The system of claim 21 wherein the periphery of said steering element is separated into virtual input zones, wherein said processor is operable to perform a different control command on said deck in response to identifying hand gestures in different input zones, and to render an image of said steering element on a display mounted in the vehicle, the image indicating which control command is associated with each input zone, in response to identifying at least one tap gesture on the outer periphery of said steering element.

35. The system of claim 21 wherein said processor is further operable to open a gas tank in the vehicle, open a trunk in the vehicle, lock doors of the vehicle, and close windows in the vehicle, in response to identifying respective hand gestures.

36. The system of claim 21 wherein said steering element comprises at least one interactive display embedded therein, wherein the vehicle comprises a vehicle display comprising either a head-down display or a head-up display, and wherein information displayed on said at least one interactive display is replicated on the vehicle display.

37. The system of claim 21 wherein said interactive deck comprises:
a display; and
a frame surrounding said display comprising a second plurality of proximity sensors operable to detect hand gestures above the frame,
wherein said processor is operable to present a graphic representing a group of related functions in a corner of said display, and to identify a diagonal hand wave gesture above said frame and beginning above the corner of said display detected by said second plurality of proximity sensors, and to translate the graphic across said display and thereby reveal icons for the related functions in response to the thus-identified diagonal hand wave gesture.

38. The system of claim 37 wherein said processor is operable to present multiple graphics in respective corners of said display.

39. A system for use in a vehicle, comprising:
a steering element situated opposite a driver seat in a vehicle, the steering element comprising:
a plurality of proximity sensors encased in the periphery of the steering element operable to detect hand gestures along the outer periphery of the steering element;
a cavity;
an array of invisible-light emitters operable to project invisible light beams across said cavity; and
an array of light detectors operable to detect the invisible light beams projected by said invisible-light emitters, and to detect gestures inside said cavity that interrupt the invisible light beams projected by said invisible-light emitters,
an interactive deck housed in the vehicle, for providing at least one of radio broadcast, video broadcast, audio entertainment, video entertainment and navigational assistance in the vehicle; and
a processor housed in the vehicle, coupled with said proximity sensors and said deck, operable (i) to identify the hand gestures detected by said proximity sensors, and to control said deck in response to thus-identified hand gestures, (ii) to identify the gestures inside said cavity detected by said light detectors, and to control said deck in response to the thus-identified gestures inside said cavity.

40. The system of claim 39 wherein said deck operates in accordance with a plurality of features having adjustable settings, wherein said processor is operative to adjust a setting of a currently selected one of said features in response to identifying hand slide gestures, and wherein said processor is operative to change the currently selected feature in response to identifying at least one tap gesture on the outer periphery of said steering element.

41. The system of claim 40 wherein said deck comprises a display, and wherein, when said processor changes the selected feature, said processor also renders a graphic indicating the newly selected feature on said display.

42. The system of claim 40 wherein the adjustable settings are members of the group consisting of volume, radio channel, track in a music library, web page, map and picture.

43. The system of claim 39 further comprising a second plurality of proximity sensors encased in said steering element and facing the driver seat, for detecting hand wave gestures between said steering element and a driver, and wherein said processor is operable to identify the hand wave gestures detected by said second proximity sensors, and to change a mode of said deck in response to the thus-identified hand wave gestures.

44. The system of claim 39 wherein said processor identifies a series of objects detected by said proximity sensors as concurrently touching said steering element, as being respective fingers on one hand, wherein, when said proximity sensors detect that one of the objects is lifted from said steering element, said processor determines which of the fingers was lifted based on a relative location of the lifted object within the series of objects, and wherein said processor performs different functions in response to identifying gestures performed by different thus-determined ones of the fingers.

45. The system of claim 39 further comprising:
multiple arrays of invisible-light emitters connected to said processor and operable to project invisible light beams across different geometric planes inside said cavity; and
multiple arrays of light detectors connected to said processor and operable to detect the invisible light beams projected by said invisible-light emitters, and to detect wave gestures across multiple geometric planes inside said cavity that interrupt the invisible light beams projected by said invisible-light emitters,
and wherein said processor is operable to identify the wave gestures inside said cavity detected by said arrays of light detectors, and to control said deck in response to the thus-identified wave gestures.

46. The system of claim 39 further comprising visible-light emitters housed in said steering element and connected to said processor, and wherein said processor is operable to activate at least one of said visible-light emitters in response said light detectors detecting that the invisible light beams projected by said invisible-light emitters are being interrupted.

47. The system of claim 39 wherein said deck comprises a display, and wherein said processor is operable to enlarge an image on said display in response to identifying a multi-finger spread gesture inside said cavity.

48. The system of claim 47 wherein said processor is operable to pan the image on said display in response to identifying a one-finger translation gesture inside said cavity.

49. The system of claim 39 wherein said processor controls said deck in response to the identified hand gestures, only when said steering element is not substantially rotated.

50. The system of claim 39 further comprising a wireless phone interface for receiving incoming phone calls, and wherein said processor is operable to reject an incoming phone call in response to identifying a single tap gesture on the outer perimeter of said steering element, and to accept an incoming call in response to identifying a double tap gesture on the outer perimeter of said steering element.

51. The system of claim 39 wherein said processor is operable to mute said deck in response to identifying a sudden quick hand slide gesture along the outer periphery of said steering element.

52. The system of claim 39 wherein the periphery of said steering element is separated into virtual input zones, wherein said processor is operable to perform a different control command on said deck in response to identifying hand gestures in different input zones, and to render an image of said steering element on a display mounted in the vehicle, the image indicating which control command is associated with each input zone, in response to identifying at least one tap gesture on the outer periphery of said steering element.

53. The system of claim 39 wherein said processor is further operable to open a gas tank in the vehicle, open a trunk in the vehicle, lock doors of the vehicle, and close windows in the vehicle, in response to identifying respective hand gestures.

54. The system of claim 39 wherein said steering element comprises at least one interactive display embedded therein, wherein the vehicle comprises a vehicle display comprising either a head-down display or a head-up display, and wherein information displayed on said at least one interactive display is replicated on the vehicle display.

55. The system of claim 39 wherein said interactive deck comprises:
a display; and
a frame surrounding said display comprising a second plurality of proximity sensors operable to detect hand gestures above the frame,
wherein said processor is operable to present a graphic representing a group of related functions in a corner of said display, and to identify a diagonal hand wave gesture above said frame and beginning above the corner of said display detected by said second plurality of proximity sensors, and to translate the graphic across said display and thereby reveal icons for the related functions in response to the thus-identified diagonal hand wave gesture.

56. The system of claim 55 wherein said processor is operable to present multiple graphics in respective corners of said display.

57. A system for use in a vehicle, comprising:
a steering element situated opposite a driver seat in a vehicle, the steering element comprising a plurality of proximity sensors encased in the periphery of the steering element operable to detect hand gestures along the outer periphery of the steering element;
an interactive deck housed in the vehicle, for providing at least one of radio broadcast, video broadcast, audio entertainment, video entertainment and navigational assistance in the vehicle; and
a processor housed in the vehicle, coupled with said proximity sensors and said deck, operable to identify a sudden quick hand slide gesture along the outer periphery of said steering element detected by said proximity sensors, and to mute said deck in response to thus-identified sudden quick hand slide gesture.

58. The system of claim 57 wherein said deck operates in accordance with a plurality of features having adjustable settings, wherein said processor is operative to adjust a setting of a currently selected one of said features in response to identifying hand slide gestures, and wherein said processor is operative to change the currently selected feature in response to identifying at least one tap gesture on the outer periphery of said steering element.

59. The system of claim 58 wherein said deck comprises a display, and wherein, when said processor changes the selected feature, said processor also renders a graphic indicating the newly selected feature on said display.

60. The system of claim 58 wherein the adjustable settings are members of the group consisting of volume, radio channel, track in a music library, web page, map and picture.

61. The system of claim 57 further comprising a second plurality of proximity sensors encased in said steering element and facing the driver seat, for detecting hand wave gestures between said steering element and a driver, and wherein said processor is operable to identify the hand wave gestures detected by said second proximity sensors, and to change a mode of said deck in response to the thus-identified hand wave gestures.

62. The system of claim 57 wherein said processor identifies a series of objects detected by said proximity sensors as concurrently touching said steering element, as being respective fingers on one hand, wherein, when said proximity sensors detect that one of the objects is lifted from said steering element, said processor determines which of the fingers was lifted based on a relative location of the lifted object within the series of objects, and wherein said processor performs different functions in response to identifying gestures performed by different thus-determined ones of the fingers.

63. The system of claim 57 wherein said processor controls said deck in response to the identified hand gestures, only when said steering element is not substantially rotated.

64. The system of claim 57 further comprising a wireless phone interface for receiving incoming phone calls, and wherein said processor is operable to reject an incoming phone call in response to identifying a single tap gesture on the outer perimeter of said steering element, and to accept an incoming call in response to identifying a double tap gesture on the outer perimeter of said steering element.

65. The system of claim 57 wherein the periphery of said steering element is separated into virtual input zones, wherein said processor is operable to perform a different control command on said deck in response to identifying hand gestures in different input zones, and to render an image of said steering element on a display mounted in the vehicle, the image indicating which control command is associated with each input zone, in response to identifying at least one tap gesture on the outer periphery of said steering element.

66. The system of claim 57 wherein said processor is further operable to open a gas tank in the vehicle, open a trunk in the vehicle, lock doors of the vehicle, and close windows in the vehicle, in response to identifying respective hand gestures.

67. The system of claim 57 wherein said steering element comprises at least one interactive display embedded therein, wherein the vehicle comprises a vehicle display comprising either a head-down display or a head-up display, and wherein information displayed on said at least one interactive display is replicated on the vehicle display.

68. The system of claim 57 wherein said interactive deck comprises:
a display; and
a frame surrounding said display comprising a second plurality of proximity sensors operable to detect hand gestures above the frame,
wherein said processor is operable to present a graphic representing a group of related functions in a corner of said display, and to identify a diagonal hand wave gesture above said frame and beginning above the corner of said display detected by said second plurality of proximity sensors, and to translate the graphic across said display and thereby reveal icons for the related functions in response to the thus-identified diagonal hand wave gesture.

69. The system of claim 68 wherein said processor is operable to present multiple graphics in respective corners of said display.

70. A system for use in a vehicle, comprising:
a steering element situated opposite a driver seat in a vehicle, the steering element comprising a plurality of proximity sensors encased in the periphery of the steering element operable to detect hand gestures along the outer periphery of the steering element;
an interactive deck housed in the vehicle, for providing at least one of radio broadcast, video broadcast, audio entertainment, video entertainment and navigational assistance in the vehicle; and
a processor housed in the vehicle, coupled with said proximity sensors and said deck, operable to identify the hand gestures detected by said proximity sensors, and to open a gas tank in the vehicle, open a trunk in the vehicle, lock doors of the vehicle, and close windows in the vehicle, in response to respective thus-identified hand gestures.

71. The system of claim 70 wherein said deck operates in accordance with a plurality of features having adjustable settings, wherein said processor is operative to adjust a setting of a currently selected one of said features in response to identifying hand slide gestures, and wherein said processor is operative to change the currently selected feature in response to identifying at least one tap gesture on the outer periphery of said steering element.

72. The system of claim 71 wherein said deck comprises a display, and wherein, when said processor changes the selected feature, said processor also renders a graphic indicating the newly selected feature on said display.

73. The system of claim 71 wherein the adjustable settings are members of the group consisting of volume, radio channel, track in a music library, web page, map and picture.

74. The system of claim 70 further comprising a second plurality of proximity sensors encased in said steering element and facing the driver seat, for detecting hand wave gestures between said steering element and a driver, and wherein said processor is operable to identify the hand wave gestures detected by said second proximity sensors, and to change a mode of said deck in response to the thus-identified hand wave gestures.

75. The system of claim 70 wherein said processor identifies a series of objects detected by said proximity sensors as concurrently touching said steering element, as being respective fingers on one hand, wherein, when said proximity sensors detect that one of the objects is lifted from said steering element, said processor determines which of the fingers was lifted based on a relative location of the lifted object within the series of objects, and wherein said processor performs different functions in response to identifying gestures performed by different thus-determined ones of the fingers.

76. The system of claim 70 wherein said processor controls said deck in response to the identified hand gestures, only when said steering element is not substantially rotated.

77. The system of claim 70 further comprising a wireless phone interface for receiving incoming phone calls, and wherein said processor is operable to reject an incoming phone call in response to identifying a single tap gesture on the outer perimeter of said steering element, and to accept an incoming call in response to identifying a double tap gesture on the outer perimeter of said steering element.

78. The system of claim 70 wherein the periphery of said steering element is separated into virtual input zones, wherein said processor is operable to perform a different control command on said deck in response to identifying hand gestures in different input zones, and to render an image of said steering element on a display mounted in the vehicle, the image indicating which control command is associated with each input zone, in response to identifying at least one tap gesture on the outer periphery of said steering element.

79. The system of claim 70 wherein said steering element comprises at least one interactive display embedded therein, wherein the vehicle comprises a vehicle display comprising either a head-down display or a head-up display, and wherein information displayed on said at least one interactive display is replicated on the vehicle display.

80. The system of claim 70 wherein said interactive deck comprises:
a display; and
a frame surrounding said display comprising a second plurality of proximity sensors operable to detect hand gestures above the frame, wherein said processor is operable to present a graphic representing a group of related functions in a corner of said display, and to identify a diagonal hand wave gesture above said frame and beginning above the corner of said display detected by said second plurality of proximity sensors, and to translate the graphic across said display and thereby reveal icons for the related functions in response to the thus-identified diagonal hand wave gesture.

81. The system of claim 80 wherein said processor is operable to present multiple graphics in respective corners of said display.

* * * * *

UNITED STATES PATENT AND TRADEMARK OFFICE
CERTIFICATE OF CORRECTION

| | | |
|---|---|---|
| PATENT NO. | : 8,775,023 B2 | Page 1 of 1 |
| APPLICATION NO. | : 14/088458 | |
| DATED | : July 8, 2014 | |
| INVENTOR(S) | : Fröjdh et al. | |

It is certified that error appears in the above-identified patent and that said Letters Patent is hereby corrected as shown below:

Title page,
Item (73), Assignee: Neanode Inc., Santa Clara, CA (US)
Please change "Neanode" to -- Neonode --

Signed and Sealed this
Fifteenth Day of March, 2016

Michelle K. Lee
*Director of the United States Patent and Trademark Office*